US012649684B2

(12) United States Patent     (10) Patent No.:   US 12,649,684 B2

Gross et al.     (45) Date of Patent:     Jun. 9, 2026

(54) LOW-MODULUS ION-EXCHANGEABLE GLASS COMPOSITIONS

(71) Applicant: Corning Incorporated, Corning, NY (US)

(72) Inventors: Timothy Michael Gross, Painted Post, NY (US); Jingshi Wu, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 127 days.

(21) Appl. No.: 18/291,600

(22) PCT Filed: Jul. 21, 2022

(86) PCT No.: PCT/US2022/037775

§ 371 (c)(1),
(2) Date: Jan. 24, 2024

(87) PCT Pub. No.: WO2023/009371

PCT Pub. Date: Feb. 2, 2023

(65) Prior Publication Data

US 2024/0336513 A1     Oct. 10, 2024

Related U.S. Application Data

(60) Provisional application No. 63/226,868, filed on Jul. 29, 2021.

(51) Int. Cl.
*C03C 3/097*     (2006.01)
*C03C 21/00*     (2006.01)

(52) U.S. Cl.
CPC ............ *C03C 3/097* (2013.01); *C03C 21/002* (2013.01)

(58) Field of Classification Search
CPC ....... C03C 3/097; C03C 21/002; C03C 3/091; C03C 3/085
See application file for complete search history.

(56) References Cited

U.S. PATENT DOCUMENTS 9,321,677 B2   4/2016   Chang et al.
9,815,733 B2   11/2017   Dejneka et al.
(Continued)

FOREIGN PATENT DOCUMENTS

WO    WO-2011114821 A1 *   9/2011   ........... C03C 21/002

OTHER PUBLICATIONS

Gehrke et al., "Fatigue limit and crack arrest in alkali-containing silicate glasses", Journal of Materials Science 26 (1991), pp. 5445-5455.
(Continued)

*Primary Examiner* — Cameron K Miller

(74) *Attorney, Agent, or Firm* — Travis B. Gasa; Russell S. Magaziner

(57) ABSTRACT

A glass composition includes: greater than or equal to 40 mol % and less than or equal to 57 mol % $SiO_2$; greater than or equal to 15 mol % and less than or equal to 30 mol % $Al_2O_3$; greater than or equal to 0 mol % and less than or equal to 10 mol % $B_2O_3$; greater than or equal to 0 mol % and less than or equal to 10 mol % $P_2O_5$; greater than or equal to 14 mol % and less than or equal to 17 mol % $Na_2O$; greater than or equal to 0 mol % and less than or equal to 7 mol % $K_2O$; and greater than or equal to 0 mol % and less than or equal to 3 mol % $Li_2O$. $R_2O/Al_2O$; is greater than or equal to 0.8. $B_2O_5+P_2O_5+K_2O$ is greater than or equal to 3 mol % and less than or equal to 25 mol %.

20 Claims, 6 Drawing Sheets

(56) References Cited

U.S. PATENT DOCUMENTS

| | | | |
|---|---|---|---|
| 9,828,282 | B2 | 11/2017 | Beall et al. |
| 9,898,046 | B2 | 2/2018 | Chang et al. |
| 2012/0135226 | A1 | 5/2012 | Bookbinder et al. |
| 2013/0004758 | A1 | 1/2013 | Dejneka et al. |
| 2013/0122284 | A1 | 5/2013 | Gross |
| 2015/0147576 | A1* | 5/2015 | Bookbinder ........... A01N 59/16 |
| | | | 65/30.14 |
| 2017/0197869 | A1 | 7/2017 | Beall et al. |
| 2021/0179482 | A1 | 6/2021 | Lezzi et al. |

OTHER PUBLICATIONS

International Search Report and Written Opinion of the International Searching Authority; PCT/US2022/037775; mailed on Nov. 10, 2022, 11 pages; European Patent Office.
Makishima et al., "Calculation of bulk modulus, shear modulus and Posson's ratio of glass", Journal of Non-Crysalline Solids 17(2) (1975), pp. 147-157.

\* cited by examiner

LOW-MODULUS ION-EXCHANGEABLE GLASS COMPOSITIONS

CROSS-REFERENCE TO RELATED APPLICATIONS

This application is a national stage entry of International Patent Application Serial No. PCT/US2022/037775, filed on Jul. 21, 2022, which in turn, claims the benefit of priority under 35 U.S.C. § 119 of U.S. Provisional Application Ser. No. 63/226,868 filed on Jul. 29, 2021, the contents of each of which are relied upon and incorporated herein by reference in their entireties.

FIELD

The present specification generally relates to ion-exchangeable glass compositions and, in particular, to ion-exchangeable glass compositions capable of providing low-modulus glass articles for cover glass applications, for example, a cover glass for a flexible display.

TECHNICAL BACKGROUND

Many consumer products, for example smart phones, tablets, portable media players, personal computers, and cameras, incorporate cover glasses that may function as display covers, and may incorporate touch functionality. Frequently, these devices are dropped by users onto hard surfaces, which can cause damage to the cover glasses, and may negatively impact the use of the devices, for example, the touch functionality may be compromised.

Foldable or flexible displays for consumer electronics applications may benefit from thin, flexible ion-exchanged glass articles. Glass articles may be made more resistant to flexure failure through ion-exchange processes, which involve inducing compressive stresses on the glass surfaces. The compressive stress introduced using an ion-exchange process serves to, among other things, arrest flaws that can cause failure of the glass article.

Therefore, a continuing need exists for ion-exchangeable glass compositions having desirable mechanical properties for use in a variety of applications, including cover glass applications.

SUMMARY

According to a first aspect A1, the glass composition may comprise: greater than or equal to 40 mol % and less than or equal to 57 mol % $SiO_2$; greater than or equal to 15 mol % and less than or equal to 30 mol % $Al_2O_3$; greater than or equal to 0 mol % and less than or equal to 10 mol % $B_2O_3$; greater than or equal to 0 mol % and less than or equal to 10 mol % $P_2O_5$; greater than or equal to 14 mol % and less than or equal to 17 mol % $Na_2O$; greater than or equal to 0 mol % and less than or equal to 7 mol % $K_2O$; and greater than or equal to 0 mol % and less than or equal to 3 mol % $Li_2O$, wherein $R_2O/Al_2O_3$ is greater than or equal to 0.8, wherein $R_2O$ is the sum of $Na_2O$, $K_2O$, and $Li_2O$; and $B_2O_3+P_2O_5+K_2O$ is greater than or equal to 3 mol % and less than or equal to 25 mol %.

A second aspect A2 includes the glass composition according to the first aspect A1, wherein $B_2O_3+P_2O_5+K_2O$ is greater than or equal to 5 mol % and less than or equal to 23 mol %.

A third aspect A3 includes the glass composition according to the first aspect A1 or second aspect A2, wherein the glass composition comprises greater than or equal to 8 mol % and less than or equal to 10 mol % $B_2O_3$.

A fourth aspect A4 includes the glass composition according to any one of the first through third aspects A1-A3, wherein the glass composition comprises greater than or equal to 0 mol % and less than or equal to 2 mol % $P_2O_5$.

A fifth aspect A5 includes the glass composition according to any one of the first through third aspects A1-A3, wherein the glass composition comprises greater than or equal to 2 mol % and less than or equal to 10 mol % $P_2O_5$.

A sixth aspect A6 includes the glass composition according to any one of the first through fifth aspects A1-A5, wherein the glass composition comprises greater than or equal to 0.5 mol % and less than or equal to 6.5 mol % $K_2O$.

A seventh aspect A7 includes the glass composition according to the sixth aspect A6, wherein the glass composition comprises greater than or equal to 1 mol % and less than or equal to 6 mol % $K_2O$.

An eighth aspect A8 includes the glass composition according to any one of the first through seventh aspects A1-A7, wherein the glass composition comprises 17.3 mol % and less than or equal to 30 mol % $Al_2O_3$.

A ninth aspect A9 includes the glass composition according to any one of the first through eighth aspects A1-A8, wherein $R_2O/Al_2O_3$ is greater than or equal to 0.9.

A tenth aspect A10 includes the composition according to any one of the first through ninth aspects A1-A9, wherein $(R_2O+P_2O_5)/Al_2O_3$ is greater than or equal to 0.9 and less than or equal to 1.5.

An eleventh aspect A11 includes the glass composition according to any one of the first through tenth aspects A1-A10, wherein the glass composition comprises greater than or equal to 14.25 mol % and less than or equal to 16.75 mol % $Na_2O$.

A twelfth aspect A12 includes the glass composition according to any one of the first through eleventh aspects A1-A11, wherein the glass composition comprises less than or equal to 5 mol % RO, wherein RO is the sum of MgO, CaO, SrO, and BaO.

A thirteenth aspect A13 includes the glass composition according to the twelfth aspect A12, wherein the glass composition comprises less than or equal to 1 mol % RO.

A fourteenth aspect A14 includes the glass composition according any one of the first through thirteenth aspects A1-A13, wherein the glass composition is free or substantially free of $Li_2O$, $Y_2O_3$, or combinations thereof.

A fifteenth aspect A15 includes the glass composition according to any one of the first through fourteenth aspects A1-A14, wherein the glass composition comprises greater than or equal to 40 mol % and less than or equal to 56 mol % $SiO_2$.

A sixteenth aspect A16 includes the glass composition according to the first aspect A1, wherein the glass composition comprises: greater than or equal to 40 mol % and less than or equal to 56 mol % $SiO_2$; greater than or equal to 8 mol % and less than or equal to 10 mol % $B_2O_3$; greater than or equal to 0 mol % and less than or equal to 2 mol % $P_2O_5$; and less than or equal to 5 mol % RO, wherein RO is the sum of MgO, CaO, SrO, and BaO, wherein $R_2O/Al_2O_3$ is greater than or equal to 0.9.

A seventeenth aspect A17 includes the glass composition according to the first aspect A1, wherein the glass composition comprises: greater than or equal to 17.3 mol % and less than or equal to 30 mol % $Al_2O_3$; greater than or equal to 2 mol % and less than or equal to 10 mol % $P_2O_5$; and less than or equal to 1 mol % RO, wherein RO is the sum of MgO, CaO, SrO, and BaO, wherein $(R_2O+P_2O_5)/Al_2O_3$ is greater than or equal to 0.9 and less than or equal to 1.5.

According to an eighteenth aspect A18, a ion-exchanged glass article may comprise: greater than or equal to 40 mol % and less than or equal to 57 mol % $SiO_2$; greater than or equal to 15 mol % and less than or equal to 30 mol % $Al_2O_3$; greater than or equal to 0 mol % and less than or equal to 10 mol % $B_2O_3$; greater than or equal to 0 mol % and less than or equal to 10 mol % $P_2O_5$; greater than or equal to 14 mol % and less than or equal to 17 mol % $Na_2O$; greater than or equal to 0 mol % and less than or equal to 7 mol % $K_2O$; and greater than or equal to 0 mol % and less than or equal to 3 mol % $Li_2O$, wherein $R_2O/Al_2O_3$ is greater than or equal to 0.8, wherein $R_2O$ is the sum of $Na_2O$, $K_2O$, and $Li_2O$; $B_2O_3+P_2O_5+K_2O$ is greater than or equal to 3 mol % and less than or equal to 25 mol %; and a Young's modulus of the glass article, before being ion-exchanged, is greater than or equal to 40 GPa and less than or equal to 70 GPa.

A nineteenth aspect A19 includes the glass article according to the eighteenth aspect A18, wherein the Young's modulus of the glass article, before being ion-exchanged, is greater than or equal to 45 GPa and less than or equal to 69 GPa.

A twentieth aspect A20 includes the glass article according to the eighteenth aspect A18 or nineteenth aspect A19, wherein a peak compressive stress of the glass article is greater than or equal to 500 MPa and less than or equal to 1100 MPa.

A twenty-first aspect A21 includes the glass article according to the twentieth aspect A20, wherein the peak compressive stress of the glass article is greater than or equal to 550 MPa and less than or equal to 1050 MPa.

A twenty-second aspect A22 includes the glass article according to any one of the eighteenth through twenty-first aspects A18-A21, wherein a ratio of peak compressive stress to Young's modulus of the glass article is greater than or equal to 13.

A twenty-third aspect A23 includes the glass article according to the twenty-second aspect A22, wherein the ratio of peak compressive stress to Young's modulus of the glass article is greater than or equal to 13.5.

A twenty-fourth aspect A24 includes the glass article according to any one of the eighteenth through twenty-third aspects A18-A23, wherein a thickness of the glass article is greater than or equal to 35 μm and less than or equal to 200 μm and a depth of compression of the glass article is greater than or equal to 5 μm and less than or equal to 40 μm.

A twenty-fifth aspect A25 includes the glass article according to the twenty-fourth aspect A24, wherein the depth of compression of the glass article is greater than or equal to 7 μm and less than or equal to 35 μm.

A twenty-sixth aspect A26 includes the glass article according to any one of the eighteenth through twenty-fifth aspects A18-A25, wherein a depth of compression of the glass article is greater than or equal to 5% and less than or equal to 20% of a thickness of the glass article.

A twenty-seventh aspect A27 includes the glass article according to any one of the eighteenth through twenty-sixth aspects A18-A26, wherein a maximum central tension of the glass article is greater than or equal to 250 MPa and less than or equal to 650 MPa.

A twenty-eighth aspect A28 includes the glass article according to any one of the eighteenth through twenty-seventh aspects A18-A27, wherein when the glass article is bent to a platen spacing of 6 mm, a maximum central tension of the bent glass article is greater than or equal to 350 MPa and less than or equal to 475 MPa at an article thickness of 35 μm.

According to the twenty-ninth aspect A29, a consumer electronic device may comprise: a housing having a front surface, a back surface, and side surfaces; electrical components provided at least partially within the housing, the electrical components including at least a controller, a memory, and a display, the display being provided at or adjacent the front surface of the housing; and the glass article according to any one of the eighteenth aspect A18 to twenty-eighth aspect A28 disposed over the display.

According to the thirtieth aspect A30, a method of strengthening a glass article may comprise: immersing the glass article in an ion-exchange solution, the glass article comprising: greater than or equal to 40 mol % and less than or equal to 57 mol % $SiO_2$; greater than or equal to 15 mol % and less than or equal to 30 mol % $Al_2O_3$; greater than or equal to 0 mol % and less than or equal to 10 mol % $B_2O_3$; greater than or equal to 0 mol % and less than or equal to 10 mol % $P_2O_5$; greater than or equal to 14 mol % and less than or equal to 17 mol % $Na_2O$; greater in than or equal to 0 mol % and less than or equal to 7 mol % $K_2O$; and greater than or equal to 0 mol % and less than or equal to 3 mol % $Li_2O$, wherein $R_2O/Al_2O_3$ is greater than or equal to 0.8, wherein $R_2O$ is the sum of $Na_2O$, $K_2O$, and $Li_2O$; and $B_2O_3+P_2O_5+K_2O$ is greater than or equal to 3 mol % and less than or equal to 25 mol %; and ion-exchanging the glass article in the ion-exchange solution for a time period greater than or equal to 0.1 hour and less than or equal to 2 hours at a temperature greater than or equal to 350° C. and less than or equal to 480° C. to achieve a compressive stress layer extending from a surface of the glass article to a depth of compression and comprising a peak compressive stress value in a range of 500 MPa to 1100 MPa.

A thirty-first aspect A31 includes the method according to the thirtieth aspect A30, wherein a thickness of the glass article is greater than or equal to 35 μm and less than or equal to 200 μm and a depth of compression of the glass article is greater than or equal to 5 μm and less than or equal to 40 μm.

A thirty-second aspect A32 includes the method according to any one of the twenty-ninth through thirty-first aspects A29-A31, wherein a Young's modulus of the glass article, before being ion-exchanged, is greater than or equal to 40 GPa and less than or equal to 70 GPa.

A thirty-third aspect A33 includes the method according to any one of the twenty-ninth through thirty-second aspects A29-A32, wherein a ratio of peak compressive stress to Young's modulus of the glass article is greater than or equal to 13.

A thirty-fourth aspect A34 includes the method according to any one of the twenty-ninth through thirty-third aspects A29-A33, wherein a maximum central tension of the glass article is greater than or equal to 250 MPa and less than or equal to 650 MPa.

A thirty-fifth aspect A35 includes the method according to any one of the twenty-ninth through thirty-fourth aspects A29-A34, wherein when the glass article is bent to a platen spacing of 6 mm, a maximum central tension of the bent glass article is greater than or equal to 350 MPa and less than or equal to 475 MPa at an article thickness of 35 μm.

Additional features and advantages of the glass compositions described herein will be set forth in the detailed description which follows, and in part will be readily apparent to those skilled in the art from that description or recognized by practicing the aspects described herein, including the detailed description which follows, the claims, as well as the appended drawings.

It is to be understood that both the foregoing general description and the following detailed description describe various aspects and are intended to provide an overview or framework for understanding the nature and character of the claimed subject matter. The accompanying drawings are included to provide a further understanding of the various aspects, and are incorporated into and constitute a part of this specification. The drawings illustrate the various aspects described herein, and together with the description serve to explain the principles and operations of the claimed subject matter.

DETAILED DESCRIPTION

Figure 1:
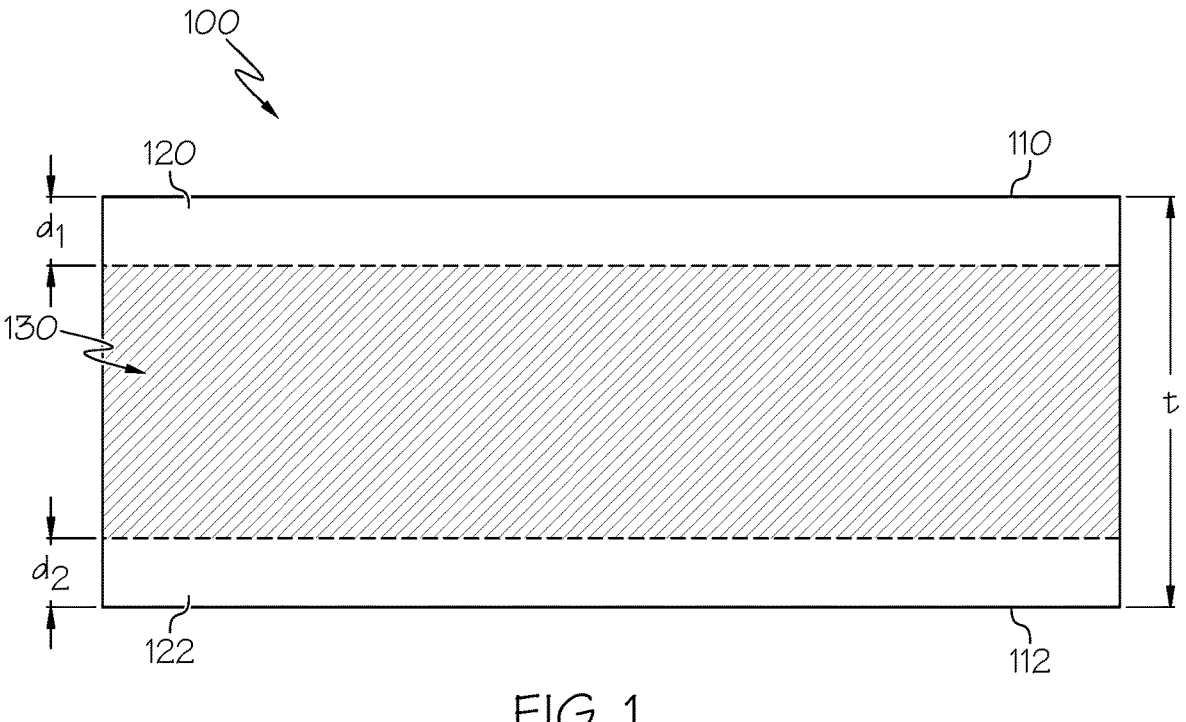
FIG. 1 is a cross-sectional, schematic view of a glass article having compressive stress regions according to one or more aspects described herein.

Reference will now be made in detail to various aspects of ion-exchangeable glass compositions having a relatively low Young's modulus. According to aspects, a glass composition includes greater than or equal to 40 mol % and less than or equal to 57 mol % $SiO_2$; greater than or equal to 15 mol % and less than or equal to 30 mol % $Al_2O_3$; greater than or equal to 0 mol % and less than or equal to 10 mol % $B_2O_3$; greater than or equal to 0 mol % and less than or equal to 10 mol % $P_2O_5$; greater than or equal to 14 mol % and less than or equal to 17 mol % $Na_2O$; greater than or equal to 0 mol % and less than or equal to 7 mol % $K_2O$; and greater than or equal to 0 mol % and less than or equal to 3 mol % $Li_2O$. $R_2O/Al_2O_3$ is greater than or equal to 0.8, wherein $R_2O$ is the sum of $Na_2O$, $K_2O$, and $Li_2O$. $B_2O_3$+ $P_2O_5$+$K_2O$ is greater than or equal to 3 mol % and less than or equal to 25 mol %. Various aspects of ion-exchangeable glass compositions and methods of strengthening low-modulus glass articles formed therefrom will be described herein with specific reference to the appended drawings.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of aspects described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the aspects of the glass compositions described herein, the concentrations of constituent components (e.g., $SiO_2$, $Al_2O_3$, and the like) are specified in mole percent (mol %) on an oxide basis, unless otherwise specified.

The term "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.1 mol %.

The terms "0 mol %" and "free," when used to describe the concentration and/or absence of a particular constituent component in a glass composition, means that the constituent component is not present in glass composition.

The term "Vogel-Fulcher-Tamman ('VFT') relation," as used herein, describes the temperature dependence of the viscosity and is represented by the following equation:

$$\log \eta = A + \frac{B}{T - T_o}$$

where $\eta$ is viscosity. To determine VFT A, VFT B, and VFT $T_o$, the viscosity of the glass composition is measured over a given temperature range. The raw data of viscosity versus temperature is then fit with the VFT equation by least-squares fitting to obtain A, B, and $T_o$. With these values, a viscosity point (e.g., 200 P Temperature, 35 k P Temperature, and 200 k P Temperature) at any temperature above softening point may be calculated.

The term "melting point," as used herein, refers to the temperature at which the viscosity of the glass composition is 200 poise as measured in accordance with ASTM C338.

The term "softening point," as used herein, refers to the temperature at which the viscosity of the glass composition is $1\times10^{7.6}$ poise. The softening point is measured according to the parallel plate viscosity method which measures the viscosity of inorganic glass from $10^7$ to $10^9$ poise as a function of temperature, similar to ASTM C1351M.

The term "annealing point" or "effective annealing temperature" as used herein, refers to the temperature at which the viscosity of the glass composition is $1\times10^{13.18}$ poise as measured in accordance with ASTM C598.

The term "strain point," as used herein, refers to the temperature at which the viscosity of the glass composition is $1\times10^{14.68}$ poise as measured in accordance with ASTM C598.

Density, as described herein, is measured by the buoyancy method of ASTM C693-93.

The term "CTE," as used herein, refers to the average coefficient of thermal expansion as measured in accordance with ASTM E228-85 over the temperature range of 25° C. to 300° C. and is expressed in terms of "ppm," unless otherwise specified.

The term "liquidus viscosity," as used herein, refers to the viscosity of the glass composition at the onset of devitrification (i.e., at the liquidus temperature as determined with the gradient furnace method according to ASTM C829-81).

The term "liquidus temperature," as used herein, refers to the temperature at which the glass composition begins to devitrify as determined with the gradient furnace method according to ASTM C829-81.

The elastic modulus (also referred to as Young's modulus) of the glass composition, as described herein, is provided in units of gigapascals (GPa) and is measured in accordance with ASTM C623.

The shear modulus of the glass composition, as described herein, is provided in units of gigapascals (GPa). The shear modulus of the glass composition is measured in accordance with ASTM C623.

Poisson's ratio, as described herein, is measured in accordance with ASTM C623.

Refractive index, as described herein, is measured in accordance with ASTM E1967.

As used herein, "peak compressive stress" refers to the highest compressive stress (CS) value measured within a compressive stress region. In aspects, the peak compressive stress is located at the surface of the glass article. In other aspects, the peak compressive stress may occur at a depth below the surface, giving the compressive stress profile the appearance of a "buried peak." Unless specified otherwise, compressive stress (including surface CS) is measured by surface stress meter (FSM) using commercially available instruments, for example, the FSM-6000, manufactured by Orihara Industrial Co., Ltd. (Japan). Surface stress measurements rely upon the accurate measurement of the stress optical coefficient (SOC) which is related to the birefringence of the glass article. SOC in turn is measured according to Procedure C (Glass Disk Method) described in ASTM C770-16, entitled "Standard Test Method for measurement of Glass Stress-Optical Coefficient." The maximum central tension (CT) values are measured using a Scattered Light Polariscope (SCALP), such as a SCALP-05 portable scattered light polariscope. The values reports for central tension (CT) herein refer to the maximum central tension, unless otherwise indicated.

According to the convention normally used in the art, compression or compressive stress (CS) is expressed as a negative (i.e., <0) stress and tension or tensile stress is expressed as a positive (i.e., >0) stress. Throughout this description, however, CS is expressed as a positive or absolute value (i.e., as recited herein, CS=|CS|).

As used herein, "depth of compression" (DOC) refers to the depth at which the stress within the glass article changes from compressive to tensile. At the DOC, the stress crosses from a compressive stress to a tensile stress and thus exhibits a stress value of zero. Depth of compression may be measured using a Scattered Light Polariscope (SCALP), such as a SCALP-05 portable scattered light polariscope. As used herein, "depth of layer" (DOL) refers to the depth within a glass article at which an ion of metal oxide diffuses into the glass article where the concentration of the ion reaches a minimum value. DOL may be measured using electron probe microanalysis (EPMA).

Flexible versions of products and components that are traditionally rigid in nature are being conceptualized for new applications. For example, flexible electronic devices may provide thin, lightweight, and flexible properties that offer opportunities for new applications, for example, curved displays and wearable devices. Many of these flexible electronic devices require flexible substrates for holding and mounting the electronic components of these devices. Metail foils have some advantages including thermal stability and chemical resistance, but suffer from high cost and a lack of optical transparency. Polymeric foils have some advantages including resistance to fatigue failure, but suffer from marginal optical transparency, lack of thermal stability and limited hermeticity.

Some of these electronic devices may also make use of flexible displays. Optical transparency and thermal stability are often important properties for flexible display applications. In addition, flexible displays should have resistance to failure at small bend radii, particularly for flexible displays that have touch screen functionality and/or may be folded. While conventional flexible glass articles are available for bending applications, such conventional articles may not provide the desired mechanical properties to enable tighter bending (i.e., small bend radii) without cracking and/or failure.

Disclosed herein are glass compositions which mitigate the aforementioned problems. Specifically, the glass compositions disclosed herein comprise $B_2O_3$, $P_2O_5$, and/or $K_2O$, which results in glass compositions having relatively low Young's modulus such that glass articles formed therefrom may subjected to relatively tighter bending. A relatively low Young's modulus also leads to a reduced central tension, which prevents fragmentation of the glass article into small pieces upon being bent, and reduced stress intensity, which prevents crack growth and glass failure. The glass compositions disclosed herein also comprise a relatively high concentration of $Na_2O$, which results in glass articles that may have a relatively high compressive stress imparted thereto during an ion-exchange process. The high peak compressive stress allows the glass article to retain net compression and, thus, contain surface flaws when the glass article is subjected to bending.

In addition, the glass compositions described herein may be used to form glass articles having a ratio of peak compressive stress value to Young's modulus value (i.e., peak compressive stress value/Young's modulus value=CS/E, where CS is in MPa and E is in GPa) of greater than or equal to 13 across a broad depth of compression range for compressive regions created by an ion-exchange process. Increasing this ratio may be difficult because surface compressive stresses imparted during an ion-exchange process may have a strong influence from Young's modulus in that a higher Young's modulus is a common path to improving compressive stress. That is, Young's modulus is a measure of the stiffness of the glass network. For example, exchanging a $K^+$ ion into a $Na^+$ site gives compressive stress, but as the network becomes stiffer, as by increasing Young's modulus, the dilatational stress is higher. Therefore, one common way to obtain a higher CS is to simply increase the Young's modulus.

However, the glass compositions described herein result in glass articles having an increased CS without significantly increasing Young's modulus. Glass compositions described herein have a low enough Young's modulus before ion-exchange and the value of compressive stress that may be imparted during an ion-exchange process is high enough to achieve a high CS/E ratio across a broad depth of compression range. With a relatively high CS/E ratio, the glass composition may remain flexible even after ion-exchange.

The glass articles are able to accept high surface compressive stresses at large depths of compression, for example, depths as high as 40 micrometers (microns and/or μm), because the glass compositions described herein resist stress relaxation that may occur during an ion-exchange process. Stress relaxation, which may be more pronounced with elevated temperature and time, is apt to occur during ion-exchange processes designed to impart high depths of compression. These characteristics of the glass compositions described herein make them suitable for various industrial applications, including high-strength cover glass applications that experience significant bending stresses in use, for example, as cover glass in flexible and foldable displays.

The glass compositions described herein may be described as aluminosilicate glass compositions and comprise $SiO_2$ and $Al_2O_3$. The glass compositions described herein also include $B_2O_3$, $P_2O_5$, and/or $K_2O$ to reduce the Young's modulus of the glass compositions. The glass compositions described herein also include a relatively high concentration of $Na_2O$ to enable the ion-exchangeability of the glass compositions and impart a high compressive stress to glass articles formed therefrom.

$SiO_2$ is the primary glass former in the glass compositions described herein and may function to stabilize the network structure of the glass compositions. The concentration of $SiO_2$ in the glass compositions should be sufficiently high (e.g., greater than or equal to 40 mol %) to provide basic glass forming capability. The amount of $SiO_2$ may be limited (e.g., to less than or equal to 57 mol %) to control the melting point of the glass composition, as the melting temperature of pure $SiO_2$ or high $SiO_2$ glasses is undesirably high. Thus, limiting the concentration of $SiO_2$ may aid in improving the meltability and the formability of the glass composition.

Accordingly, in aspects, the glass composition may comprise greater than or equal to 40 mol % and less than or equal to 57 mol % $SiO_2$. In aspects, the glass composition may comprise greater than or equal to 40 mol % and less than or equal to 56 mol % $SiO_2$. In aspects, the concentration of $SiO_2$ in the glass composition may be greater than or equal to 40 mol %, greater than or equal to 42 mol %, greater than or equal to 44 mol %, greater than or equal to 46 mol %, or even greater than or equal to 48 mol %. In aspects, the concentration of $SiO_2$ in the glass composition may be less than or equal to 57 mol %, less than or equal to 55 mol %, or even less than or equal to 53 mol %. In aspects, the concentration of $SiO_2$ in the glass composition may greater than or equal to 40 mol % and less than or equal to 57 mol %, greater than or equal to 40 mol % and less than or equal to 55 mol %, greater than or equal to 40 mol % and less than or equal to 53 mol %, greater than or equal to 42 mol % and less than or equal to 57 mol %, greater than or equal to 42 mol % and less than or equal to 55 mol %, greater than or equal to 42 mol % and less than or equal to 53 mol %, greater than or equal to 44 mol % and less than or equal to 57 mol %, greater than or equal to 44 mol % and less than or equal to 55 mol %, greater than or equal to 44 mol % and less than or equal to 53 mol %, greater than or equal to 46 mol % and less than or equal to 57 mol %, greater than or equal to 46 mol % and less than or equal to 55 mol %, greater than or equal to 46 mol % and less than or equal to 53 mol %, greater than or equal to 48 mol % and less than or equal to 57 mol %, greater than or equal to 48 mol % and less than or equal to 55 mol %, or even greater than or equal to 48 mol % and less than or equal to 53 mol %, or any and all sub-ranges formed from any of these endpoints.

Like $SiO_2$, $Al_2O_3$ may also stabilize the glass network and additionally provides improved mechanical properties and chemical durability to the glass composition. The amount of $Al_2O_3$ may also be tailored to the control the viscosity of the glass composition. $Al_2O_3$ also charge balances $Na_2O$ present in the glass composition by forming sodium aluminate ($NaAlO_2$), thereby keeping boron in a three-coordinate state, which helps to reduce the Young's modulus. The concentration of $Al_2O_3$ should be sufficiently high (e.g., greater than or equal to 15 mol %) such that the glass composition has the desired Young's modulus (e.g., greater than or equal to 40 GPa and less than or equal to 70 GPa). However, if the amount of $Al_2O_3$ is too high (e.g., greater than 30 mol %), the viscosity of the melt may increase, thereby diminishing the formability of the glass composition. In aspects, the glass composition may comprise greater than or equal to 15 mol % and less than or equal to 30 mol % $Al_2O_3$. In aspects, the glass composition may comprise greater than or equal to 17.3 mol % and less than or equal to 30 mol % $Al_2O_3$. In aspects, the concentration of $Al_2O_3$ in the glass composition may be greater than or equal to 15 mol %, greater than or equal to 16 mol %, greater than or equal to 17.3 mol %, or even greater than or equal to 18 mol %. In aspects, the concentration of $Al_2O_3$ in the glass composition may be less than or equal to 30 mol %, less than or equal to 28 mol %, less than or equal to 26 mol %, less than or equal to 24 mol %, or even less than or equal to 22 mol %. In aspects, the concentration of $Al_2O_3$ in the glass composition may be greater than or equal to 15 mol % and less than or equal to 30 mol %, greater than or equal to 15 mol % and less than or equal to 28 mol %, greater than or equal to 15 mol % and less than or equal to 26 mol %, greater than or equal to 15 mol % and less than or equal to 24 mol %, greater than or equal to 15 mol % and less than or equal to 22 mol %, greater than or equal to 16 mol % and less than or equal to 30 mol %, greater than or equal to 16 mol % and less than or equal to 28 mol %, greater than or equal to 16 mol % and less than or equal to 26 mol %, greater than or equal to 16 mol % and less than or equal to 24 mol %, greater than or equal to 16 mol % and less than or equal to 22 mol %, greater than or equal to 17.3 mol % and less than or equal to 30 mol %, greater than or equal to 17.3 mol % and less than or equal to 28 mol %, greater than or equal to 17.3 mol % and less than or equal to 26 mol %, greater than or equal to 17.3 mol % and less than or equal to 24 mol %, greater than or equal to 17.3 mol % and less than or equal to 22 mol %, greater than or equal to 18 mol % and less than or equal to 30 mol %, greater than or equal to 18 mol % and less than or equal to 28 mol %, greater than or equal to 18 mol % and less than or equal to 26 mol %, greater than or equal to 18 mol % and less than or equal to 24 mol %, or even greater than or equal to 18 mol % and less than or equal to 22 mol %, or any and all sub-ranges formed from any of these endpoints.

The sum of $B_2O_3$, $P_2O_5$, and $K_2O$ (i.e., $B_2O_3$ (mol %)+$P_2O_5$ (mol %)+$K_2O$ (mol %)) in the glass composition may be greater than or equal to 3 mol % and less than or equal to 25 mol % to decrease the Young's modulus of the glass composition, thereby reducing the central tension and stress intensity of a glass article formed therefrom. In aspects, $B_2O_3$+$P_2O_5$+$K_2O$ in the glass composition may be greater than or equal to 5 mol % and less than or equal to 23 mol %. In aspects, $B_2O_3$+$P_2O_5$+$K_2O$ in the glass composition may be greater than or equal to 3 mol %, greater than or equal to 5 mol %, greater than or equal to 7 mol %, or even greater than or equal to 9 mol %. In aspects, $B_2O_3$+$P_2O_5$+$K_2O$ in the glass composition may be less than or equal to 25 mol %, less than or equal to 23 mol %, less than or equal to 20 mol %, less than or equal to 17 mol %, or even less than or equal to 15 mol %. In aspects, $B_2O_3$+$P_2O_5$+$K_2O$ in the glass composition may be greater than or equal to 3 mol % and less than or equal to 25 mol %, greater than or equal to 3 mol % and less than or equal to 23 mol %, greater than or equal to 3 mol % and less than or equal to 20 mol %, greater than or equal to 3 mol % and less than or equal to 17 mol %, greater than or equal to 3 mol % and less than or equal to 15 mol %, greater than or equal to 5 mol % and less than or equal to 25 mol %, greater than or equal to 5 mol % and less than or equal to 23 mol %, greater than or equal to 5 mol % and less than or equal to 20 mol %, greater than or equal to 5 mol % and less than or equal to 17 mol %, greater than or equal to 5 mol % and less than or equal to 15 mol %, greater than or equal to 7 mol % and less than or equal to 25 mol %, greater than or equal to 7 mol % and less than or equal to 23 mol %, greater than or equal to 7 mol % and less than or equal to 20 mol %, greater than or equal to 7 mol % and less than or equal to 17 mol %, greater than or equal to 7 mol % and less than or equal to 15 mol %, greater than or equal to 9 mol % and less than or equal to 25 mol %, greater than or equal to 9 mol % and less than or equal to 23 mol %, greater than or equal to 9 mol % and less than or equal to 20 mol %, greater than or equal to 9 mol % and less than or equal to 17 mol %, or even greater than or equal to 9 mol % and less than or equal to 15 mol %, or any and all sub-ranges formed from any of these endpoints.

When the boron present is not charge balanced by alkali oxides (such as $Na_2O$, $Li_2O$ and $K_2O$) or divalent cation oxides (such as $MgO$, $CaO$, $SrO$, $BaO$, and $ZnO$), the boron will be in a trigonal-coordinated state (or three-coordinated boron), which opens up the structure of the glass. The network around these three-coordinated boron atoms is not as rigid as tetrahedrally coordinated (or four-coordinated) boron. Without being bound by theory, it is believed that glass compositions that include three-coordinated boron can tolerate some degree of deformation (e.g., flexing and/or bending) before crack formation compared to four-coordinated boron. By tolerating some deformation, the Vickers indentation crack initiation threshold values increase. $B_2O_3$ may also decrease the melting temperature of the glass composition. If $B_2O_3$ is too high, the chemical durability and liquidus viscosity may diminish and volatilization and evaporation of $B_2O_3$ during melting becomes difficult to control. Therefore, if present, the concentration of $B_2O_3$ may be limited (e.g., less than or equal to 10 mol %) to maintain chemical durability and manufacturability of the glass composition.

In aspects, the glass composition may comprise greater than or equal to 0 mol % and less than or equal to 10 mol % $B_2O_3$. In aspects, the glass composition may comprise greater than or equal to 8 mol % and less than or equal to 10 mol % $B_2O_3$. In aspects, the concentration of $B_2O_3$ in the glass composition may be greater than or equal to 0 mol %, greater than or equal to 1 mol %, greater than or equal to 3 mol %, greater than or equal to 5 mol %, greater than or equal to 7 mol %, or even greater than or equal to 8 mol %. In aspects, the concentration of $B_2O_3$ in the glass composition may be less than or equal to 10 mol %, less than or equal to 9.5 mol %, or even less than or equal to 9 mol %. In aspects, the concentration of $B_2O_3$ in the glass composition may be greater than or equal to 0 mol % and less than or equal to 10 mol %, greater than or equal to 0 mol % and less than or equal to 9.5 mol %, greater than or equal to 0 mol % and less than or equal to 9 mol %, greater than or equal to 1 mol % and less than or equal to 10 mol %, greater than or equal to 1 mol % and less than or equal to 9.5 mol %, greater than or equal to 1 mol % and less than or equal to 9 mol %, greater than or equal to 3 mol % and less than or equal to 10 mol %, greater than or equal to 3 mol % and less than or equal to 9.5 mol %, greater than or equal to 3 mol % and less than or equal to 9 mol %, greater than or equal to 5 mol % and less than or equal to 10 mol %, greater than or equal to 5 mol % and less than or equal to 9.5 mol %, greater than or equal to 5 mol % and less than or equal to 9 mol %, greater than or equal to 7 mol % and less than or equal to 10 mol %, greater than or equal to 7 mol % and less than or equal to 9.5 mol %, greater than or equal to 7 mol % and less than or equal to 9 mol %, greater than or equal to 8 mol % and less than or equal to 10 mol %, greater than or equal to 8 mol % and less than or equal to 9.5 mol %, or even greater than or equal to 8 mol % and less than or equal to 9 mol %, or any and all sub-ranges formed from any of these endpoints. In aspects, the glass composition may be free or substantially free of $B_2O_3$.

In addition to decreasing the Young's modulus of the glass composition, $P_2O_5$ may also lower the melting and liquidus temperatures and may increase inter-ionic diffusivity such that the time required for ion-exchange is reduced. In aspects, the glass composition may comprise greater than or equal to 0 mol % and less than or equal to 10 mol % $P_2O_5$. In aspects, the glass composition may comprise greater than or equal to 0 mol % and less than or equal to 2 mol % $P_2O_5$. In aspects, the glass composition may comprise greater than or equal to 2 mol % and less than or equal to 10 mol % $P_2O_5$. In aspects, the concentration of $P_2O_5$ in the glass composition may be greater than or equal to 0 mol %, greater than or equal to 1 mol %, or even greater than or equal to 2 mol %. In aspects, the concentration of $P_2O_5$ in the glass composition may be less than or equal to 10 mol %, less than or equal to 8 mol %, less than or equal to 6 mol %, less than or equal to 4 mol %, or even less than or equal to 2 mol %. In aspects, the concentration of $P_2O_5$ in the glass composition may be greater than or equal to 0 mol % and less than or equal to 10 mol %, greater than or equal to 0 mol % and less than or equal to 8 mol %, greater than or equal to 0 mol % and less than or equal to 6 mol %, greater than or equal to 0 mol % and less than or equal to 4 mol %, greater than or equal to 0 mol % and less than or equal to 2 mol %, greater than or equal to 1 mol % and less than or equal to 10 mol %, greater than or equal to 1 mol % and less than or equal to 8 mol %, greater than or equal to 1 mol % and less than or equal to 6 mol %, greater than or equal to 1 mol % and less than or equal to 4 mol %, greater than or equal to 1 mol % and less than or equal to 2 mol %, greater than or equal to 2 mol % and less than or equal to 10 mol %, greater than or equal to 2 mol % and less than or equal to 8 mol %, greater than or equal to 2 mol % and less than or equal to 6 mol %, or even greater than or equal to 2 mol % and less than or equal to 4 mol %, or any and all sub-ranges formed from any of these endpoints. In aspects, the glass composition may be free or substantially free of $P_2O_5$.

In addition to decreasing the Young's modulus of the glass composition, $K_2O$, when included, promotes ion-exchange and may increase the depth of compression and decrease the melting point to improve the formability of the glass composition. However, adding too much $K_2O$ may cause the surface compressive stress and melting point to be too low. Accordingly, in aspects, the amount of $K_2O$ added to the glass composition may be limited. In aspects, the glass composition may comprise greater than or equal to 0 mol % and less than or equal to 7 mol % $K_2O$. In aspects, the glass composition may comprise greater than or equal to 0.5 mol % and less than or equal to 6.5 mol % $K_2O$. In aspects, the glass composition may comprise greater than or equal to 1 mol % and less than or equal to 6 mol % $K_2O$. In aspects, concentration of $K_2O$ in the glass composition may be greater than or equal to 0 mol, greater than or equal to 0.5 mol %, greater than or equal to 1 mol %, or even greater than or equal to 2 mol %. In aspects, the concentration of $K_2O$ in the glass composition may be less than or equal to 7 mol %, less than or equal to 6.5 mol %, less than or equal to 6 mol %, less than or equal to 5.5 mol %, or even less than or equal to 5 mol %. In aspects, the concentration of $K_2O$ in the glass composition may be greater than or equal to 0 mol % and less than or equal to 7 mol %, greater than or equal to 0 mol % and less than or equal to 6.5 mol %, greater than or equal to 0 mol % and less than or equal to 6 mol %, greater than or equal to 0 mol % and less than or equal to 5.5 mol %, greater than or equal to 0 mol % and less than or equal to 5 mol %, greater than or equal to 0.5 mol % and less than or equal to 7 mol %, greater than or equal to 0.5 mol % and less than or equal to 6.5 mol %, greater than or equal to 0.5 mol % and less than or equal to 6 mol %, greater than or equal to 0.5 mol % and less than or equal to 5.5 mol %, greater than or equal to 0.5 mol % and less than or equal to 5 mol %, greater than or equal to 1 mol % and less than or equal to 7 mol %, greater than or equal to 1 mol % and less than or equal to 6.5 mol %, greater than or equal to 1 mol % and less than or equal to 6 mol %, greater than or equal to 1 mol % and less than or equal to 5.5 mol %, greater than or equal to 1 mol % and less than or equal to 5 mol %, greater than or equal to 2 mol % and less than or equal to 7 mol %, greater than or equal to 2 mol % and less than or equal to 6.5 mol %, greater than or equal to 2 mol % and less than or equal to 6 mol %, greater than or equal to 2 mol % and less than or equal to 5.5 mol %, or even greater than or equal to 2 mol % and less than or equal to 5 mol %, or any and all sub-ranges formed from any of these endpoints. In aspects, the glass composition may be free or substantially free of $K_2O$.

As described hereinabove, the glass compositions may contain $Na_2O$, to enable the ion-exchangeability of the glass compositions to produce glass articles having a relatively high compressive stress. $Na_2O$ also reduces the softening point of the glass composition thereby increasing the formability of the glass. In aspects, the glass composition may comprise greater than or equal to 14 mol % and less than or equal to 17 mol % $Na_2O$. In aspects, the glass composition may comprise greater than or equal to 14.25 mol % and less than or equal to 16.75 mol % $Na_2O$. In aspects, the concentration of $Na_2O$ present in the glass composition may be greater than or equal to 14 mol %, greater than or equal to 14.25 mol %, greater than or equal to 14.5 mol %, greater than or equal to 14.75 mol %, or even greater than or equal to 15 mol %. In aspects, the concentration of $Na_2O$ present in the glass composition may be less than or equal to 17 mol %, less than or equal to 16.75 mol %, or even less than or equal to 16.5 mol %. In aspects, the concentration of $Na_2O$ present in the glass composition may be greater than or equal to 14 mol % and less than or equal to 17 mol %, greater than or equal to 14 mol % and less than or equal to 16.75 mol %, greater than or equal to 14 mol % and less than or equal to 16.5 mol %, greater than or equal to 14.25 mol % and less than or equal to 17 mol %, greater than or equal to 14.25 mol % and less than or equal to 16.75 mol %, greater than or equal to 14.25 mol % and less than or equal to 16.5 mol %, greater than or equal to 14.5 mol % and less than or equal to 17 mol %, greater than or equal to 14.5 mol % and less than or equal to 16.75 mol %, greater than or equal to 14.5 mol % and less than or equal to 16.5 mol %, greater than or equal to 14.75 mol % and less than or equal to 17 mol %, greater than or equal to 14.75 mol % and less than or equal to 16.75 mol %, greater than or equal to 14.75 mol % and less than or equal to 16.5 mol %, greater than or equal to 15 mol % and less than or equal to 17 mol %, greater than or equal to 15 mol % and less than or equal to 16.75 mol %, or even greater than or equal to 15 mol % and less than or equal to 16.5 mol %, or any and all sub-ranges formed from any of these endpoints.

The glass compositions described herein may further comprise alkali metal oxides other than $K_2O$ and $Na_2O$, such as $Li_2O$. In addition to aiding in ion-exchangeability of the glass composition, $Li_2O$ decreases the melting point and improves formability of the glass composition. In aspects, the glass composition may comprise greater than or equal to 0 mol % and less than or equal to 3 mol % $Li_2O$. In aspects, the concentration of $Li_2O$ in the glass composition may be greater than or equal to 0 mol %, greater than or equal to 0.5 mol %, or even greater than or equal to 1 mol %. In aspects, the concentration of $Li_2O$ in the glass composition may be less than or equal to 3 mol % or even less than or equal to 2 mol %. In aspects, the concentration of $Li_2O$ in the glass composition may be greater than or equal to 0 mol % and less than or equal to 3 mol %, greater than or equal to 0 mol % and less than or equal to 2 mol %, greater than or equal to 0.5 mol % and less than or equal to 3 mol %, greater than or equal to 0.5 mol % and less than or equal to 2 mol %, greater than or equal to 1 mol % and less than or equal to 3 mol %, or even greater than or equal to 1 mol % and less than or equal to 2 mol %, or any and all sub-ranges and formed from any of these endpoints. In aspects, the glass composition may be free or substantially free of $Li_2O$.

As used herein, $R_2O$ is the sum (in mol %) of $Na_2O$, $K_2O$, and $Li_2O$ (i.e., $R_2O$=$Na_2O$ (mol %)+$K_2O$ (mol %)+$Li_2O$ (mol %) present in the glass composition. Alkali oxides, such as $Na_2O$, $K_2O$, and $Li_2O$, aid in decreasing the softening point and molding temperature of the glass composition, thereby offsetting the increase in the softening point and molding temperature of the glass composition due to higher amounts of $SiO_2$ in the glass composition, for example. The decrease in the softening point and molding temperature may be further reduced by including combinations of alkali oxides (e.g., two or more alkali oxides) in the glass composition, a phenomenon referred to as the "mixed alkali effect." However, it has been found that if the amount of alkali oxide is too high, the average coefficient of thermal expansion of the glass composition increases to greater than $100\times10^{-7}/°$ C., which may be undesirable.

In aspects, the concentration of $R_2O$ in the glass composition may be greater than or equal to 14 mol %, greater than or equal to 15 mol %, or even greater than or equal to 16 mol. In aspects, the concentration of $R_2O$ in the glass composition may be less than or equal to 27 mol %, less than or equal to 25 mol %, or even less than or equal to 23 mol %. In aspects, the concentration of $R_2O$ in the glass composition may be greater than or equal to 14 mol % and less than or equal to 27 mol %, greater than or equal to 14 mol % and less than or equal to 25 mol %, greater than or equal to 14 mol % and less than or equal to 23 mol %, greater than or equal to 15 mol % and less than or equal to 27 mol %, greater than or equal to 15 mol % and less than or equal to 25 mol %, greater than or equal to 15 mol % and less than or equal to 23 mol %, greater than or equal to 16 mol % and less than or equal to 27 mol %, greater than or equal to 16 mol % and less than or equal to 25 mol %, or even greater than or equal to 16 mol % and less than or equal to 23 mol %, or any and all sub-ranges formed from any of these endpoints.

In aspects, the ratio of $R_2O$ and $Al_2O_3$ (i.e., $R_2O$ (mol %)/$Al_2O_3$ (mol %)) in the glass composition is greater than or equal to 0.8 to improve meltability and reduce stress relaxation after ion-exchange. When $R_2O/Al_2O_3$ is less than 0.8, the glass composition may become harder to melt and defects (e.g., unmelted raw material) may occur. $R_2O/Al_2O_3$ may also be limited (e.g., less than or equal to 1.5) such that the glass composition does not have an excess of non-bridging oxygen, which may cause the strain point to decrease and stress relaxation to occur during the ion-exchange process, leading to a low surface compressive stress. In aspects, $R_2O/Al_2O_3$ in the glass composition may be greater than or equal to 0.8. In aspects, $R_2O/Al_2O_3$ in the glass composition may be greater than or equal to 0.9. In aspects, $R_2O/Al_2O_3$ in the glass composition may be greater than or equal to 0.9 and less than or equal to 1.5. In aspects, $R_2O/Al_2O_3$ in the glass composition may be greater than or equal to 0.8, greater than or equal to 0.85, greater than or equal to 0.9, or even greater than or equal to 0.95. In aspects, $R_2O/Al_2O_3$ in the glass composition may be less than or equal to 1.5, less than or equal to 1.4, less than or equal to 1.3, less than or equal to 1.2, or even less than or equal to 1.1. In aspects, $R_2O/Al_2O_3$ in the glass composition may be greater than or equal to 0.8 and less than or equal to 1.5, greater than or equal to 0.8 and less than or equal to 1.4, greater than or equal to 0.8 and less than or equal to 1.3, greater than or equal to 0.8 and less than or equal to 1.2, greater than or equal to 0.8 and less than or equal to 1.1, greater than or equal to 0.85 and less than or equal to 1.5, greater than or equal to 0.85 and less than or equal to 1.4, greater than or equal to 0.85 and less than or equal to 1.3, greater than or equal to 0.85 and less than or equal to 1.2, greater than or equal to 0.85 and less than or equal to 1.1, greater than or equal to 0.9 and less than or equal to 1.5, greater than or equal to 0.9 and less than or equal to 1.4, greater than or equal to 0.9 and less than or equal to 1.3, greater than or equal to 0.9 and less than or equal to 1.2, greater than or equal to 0.9 and less than or equal to 1.1, greater than or equal to 0.95 and less than or equal to 1.5, greater than or equal to 0.95 and less than or equal to 1.4, greater than or equal to 0.95 and less than or equal to 1.3, greater than or equal to 0.95 and less than or equal to 1.2, or even greater than or equal to 0.95 and less than or equal to 1.1, or any and all sub-ranges formed from any of these endpoints.

In aspects, the ratio of the sum of $R_2O$ and $P_2O_5$ to $Al_2O_3$ (i.e., ($R_2O$ (mol %)+$P_2O_5$ (mol %))/$Al_2O_3$ (mol %)) in the glass composition is greater than or equal to 0.9 to help reduce or prevent phase separation and less than or equal to 1.5 to ensure durability and reduce the concentration of non-bridging oxygen. When the concentration of non-bridging oxygen is high, the inter-diffusivity may become low, thereby reducing the ion-exchangeability of the glass. In aspects, ($R_2O$+$P_2O_5$)/$Al_2O_3$ in the glass composition may be greater than or equal to 0.9, greater than or equal to 0.95, or even greater than or equal to 1. In aspects, ($R_2O$+$P_2O_5$)/$Al_2O_3$ in the glass composition may be less than or equal to 1.5, less than or equal to 1.4, or even less than or equal to 1.3. In aspects, ($R_2O$+$P_2O_5$)/$Al_2O_3$ in the glass composition may be greater than or equal to 0.9 and less than or equal to 1.5, greater than or equal to 0.9 and less than or equal to 1.4, greater than or equal to 0.9 and less than or equal to 1.3, greater than or equal to 0.95 and less than or equal to 1.5, greater than or equal to 0.95 and less than or equal to 1.4, greater than or equal to 0.95 and less than or equal to 1.3, greater than or equal to 1 and less than or equal to 1.5, greater than or equal to 1 and less than or equal to 1.4, or even greater than or equal to 1 and less than or equal to 1.3, or any and all sub-ranges formed from any of these endpoints.

As used herein, RO is the sum (in mol %) of MgO, CaO, SrO, and BaO (i.e., RO=MgO (mol %)+CaO (mol %)+SrO (mol %)+BaO (mol %)) present in the glass composition. In aspects, RO in the glass composition may be less than or equal to 5 mol % to help ensure that a relatively low Young's modulus (e.g., less than or equal to 70 GPa) is achieved. In aspects, RO in the glass composition may be less than or equal to 1 mol %. In aspects, RO in the glass composition may be greater than or equal to 0 mol % or even greater than or equal to 0.5 mol %. In aspects, RO in the glass composition may be less than or equal to 5 mol %, less than or equal to 3 mol %, or even less than or equal to 1 mol %. In aspects, RO in the glass composition may be greater than or equal to 0 mol % and less than or equal to 5 mol %, greater than or equal to 0 mol % and less than or equal to 3 mol %, greater than or equal to 0 mol % and less than or equal to 1 mol %, greater than or equal to 0.5 mol % and less than or equal to 5 mol %, greater than or equal to 0.5 mol % and less than or equal to 3 mol %, greater than or equal to 0.5 mol % and less than or equal to 1 mol %. In aspects, the glass composition may be free or substantially free of RO.

In aspects, the glass compositions described herein may comprise MgO. In aspects, the concentration of MgO in the glass composition may be greater than or equal to 0 mol % or even greater than or equal to 0.5 mol %. In aspects, the concentration of MgO in the glass composition may be less than or equal to 5 mol %, less than or equal to 3 mol %, or even less than or equal to 1 mol %. In aspects, the concentration of MgO in the glass composition may be greater than or equal to 0 mol % and less than or equal to 5 mol %, greater than or equal to 0 mol % and less than or equal to 3 mol %, greater than or equal to 0 mol % and less than or equal to 1 mol %, greater than or equal to 0.5 mol % and less than or equal to 5 mol %, greater than or equal to 0.5 mol % and less than or equal to 3 mol %, greater than or equal to 0.5 mol % and less than or equal to 1 mol %. In aspects, the glass composition may be free or substantially free of MgO.

In aspects, the glass compositions described herein may comprise CaO. In aspects, the concentration of CaO in the glass composition may be greater than or equal to 0 mol % or even greater than or equal to 0.5 mol %. In aspects, the concentration of CaO in the glass composition may be less than or equal to 5 mol %, less than or equal to 3 mol %, or even less than or equal to 1 mol %. In aspects, the concentration of CaO in the glass composition may be greater than or equal to 0 mol % and less than or equal to 5 mol %, greater than or equal to 0 mol % and less than or equal to 3 mol %, greater than or equal to 0 mol % and less than or equal to 1 mol %, greater than or equal to 0.5 mol % and less than or equal to 5 mol %, greater than or equal to 0.5 mol % and less than or equal to 3 mol %, greater than or equal to 0.5 mol % and less than or equal to 1 mol %. In aspects, the glass composition may be free or substantially free of CaO.

In aspects, the glass compositions described herein may comprise SrO. In aspects, the concentration of SrO in the glass composition may be greater than or equal to 0 mol % or even greater than or equal to 0.5 mol %. In aspects, the concentration of SrO in the glass composition may be less than or equal to 5 mol %, less than or equal to 3 mol %, or even less than or equal to 1 mol %. In aspects, the concentration of SrO in the glass composition may be greater than or equal to 0 mol % and less than or equal to 5 mol %, greater than or equal to 0 mol % and less than or equal to 3 mol %, greater than or equal to 0 mol % and less than or equal to 1 mol %, greater than or equal to 0.5 mol % and less than or equal to 5 mol %, greater than or equal to 0.5 mol % and less than or equal to 3 mol %, greater than or equal to 0.5 mol % and less than or equal to 1 mol %. In aspects, the glass composition may be free or substantially free of SrO.

In aspects, the glass compositions described herein may comprise BaO. In aspects, the concentration of BaO in the glass composition may be greater than or equal to 0 mol % or even greater than or equal to 0.5 mol %. In aspects, the concentration of BaO in the glass composition may be less than or equal to 5 mol %, less than or equal to 3 mol %, or even less than or equal to 1 mol %. In aspects, the concentration of BaO in the glass composition may be greater than or equal to 0 mol % and less than or equal to 5 mol %, greater than or equal to 0 mol % and less than or equal to 3 mol %, greater than or equal to 0 mol % and less than or equal to 1 mol %, greater than or equal to 0.5 mol % and less than or equal to 5 mol %, greater than or equal to 0.5 mol % and less than or equal to 3 mol %, greater than or equal to 0.5 mol % and less than or equal to 1 mol %. In aspects, the glass composition may be free or substantially free of BaO.

In aspects, the glass compositions described herein may further include one or more fining agents. In aspects, the fining agents may include, for example, $SnO_2$. In aspects, the concentration of $SnO_2$ in the glass composition may be greater than or equal to 0 mol % and less than or equal to 0.1 mol %. In aspects, the glass composition may be free or substantially free of $SnO_2$.

In aspects, the glass compositions described herein may further include tramp materials such as $TiO_2$, MnO, $MoO_3$, $WO_3$, $Y_2O_3$, CdO, $As_2O_3$, $Sb_2O_3$, sulfur-based compounds, such as sulfates, halogens, or combinations thereof. In aspects, the glass compositions and may be free or substantially free of individual tramp materials, a combination of tramp materials, or all tramp materials. For example, in aspects, the glass compositions may be free or substantially free of $TiO_2$, MnO, $MoO_3$, $WO_3$, $Y_2O_3$, CdO, $As_2O_3$, $Sb_2O_3$, sulfur-based compounds, such as sulfates, halogens, or combinations thereof.

In aspects, the glass compositions described herein may be free or substantially free of $Li_2O$, $Y_2O_3$, or combinations thereof.

As described herein, the glass compositions have a relatively low Young's modulus (e.g., less than or equal to 70 GPa) such that glass articles formed therefrom may subjected to relatively tighter bending. In aspects, the glass composition may have a Young's modulus greater than or equal to 40 GPa and less than or equal to 70 GPa. In aspects, the glass composition may have a Young's modulus greater than or equal to 45 GPa and less than or equal to 69 GPa. In aspects, the glass composition may have a Young's modulus greater than or equal to 40 GPa, greater than or equal to 45 GPa, greater than or equal to 50 GPa, greater than or equal to 55 GPa, or even greater than or equal to 60 GPa. In aspects, the glass composition may have a Young's modulus less than or equal to 70 GPa, less than or equal to 69 GPa, less than or equal to 67 GPa, or even less than or equal to 65 GPa. In aspects, the glass composition may have a Young's modulus greater than or equal to 40 GPa and less than or equal to 70 GPa, greater than or equal to 40 GPa and less than or equal to 69 GPa, greater than or equal to 40 GPa and less than or equal to 67 GPa, greater than or equal to 40 GPa and less than or equal to 65 GPa, greater than or equal to 45 GPa and less than or equal to 70 GPa, greater than or equal to 45 GPa and less than or equal to 69 GPa, greater than or equal to 45 GPa and less than or equal to 67 GPa, greater than or equal to 45 GPa and less than or equal to 65 GPa, greater than or equal to 50 GPa and less than or equal to 70 GPa, greater than or equal to 50 GPa and less than or equal to 69 GPa, greater than or equal to 50 GPa and less than or equal to 67 GPa, greater than or equal to 50 GPa and less than or equal to 65 GPa, greater than or equal to 55 GPa and less than or equal to 70 GPa, greater than or equal to 55 GPa and less than or equal to 69 GPa, greater than or equal to 55 GPa and less than or equal to 67 GPa, greater than or equal to 55 GPa and less than or equal to 65 GPa, greater than or equal to 60 GPa and less than or equal to 70 GPa, greater than or equal to 60 GPa and less than or equal to 69 GPa, greater than or equal to 60 GPa and less than or equal to 67 GPa, or even greater than or equal to 60 GPa and less than or equal to 65 GPa, or any and all sub-ranges formed from any of these endpoints.

In aspects, the glass composition may have a liquidus viscosity greater than or equal to 50 kP, greater than or equal to 100 kP, greater than or equal to 250 kP, or even greater than or equal to 500 kP. In aspects, the glass composition may have a liquidus viscosity less than or equal to 5000 kP, less than or equal to 2500 kP, or even less than or equal to 1000 kP. In aspects, the glass composition may have a liquidus viscosity greater than or equal to 50 kP and less than or equal to 5000 kP, greater than or equal to 50 kP and less than or equal to 2500 kP, greater than or equal to 50 kP and less than or equal to 1000 kP, greater than or equal to 100 kP and less than or equal to 5000 kP, greater than or equal to 100 kP and less than or equal to 2500 kP, greater than or equal to 100 kP and less than or equal to 1000 kP, greater than or equal to 250 kP and less than or equal to 5000 kP, greater than or equal to 250 kP and less than or equal to 2500 kP, greater than or equal to 250 kP and less than or equal to 1000 kP, greater than or equal to 500 kP and less than or equal to 5000 kP, greater than or equal to 500 kP and less than or equal to 2500 kP, or even greater than or equal to 500 kP and less than or equal to 1000 kP, or any and all sub-ranges formed from any of these endpoints. These ranges of viscosities allow the glass compositions to be formed into sheets by a variety of different techniques including, without limitation, fusion forming, slot draw, floating, rolling, and other sheet-forming processes known to those in the art. However, it should be understood that other processes may be used for forming other articles (i.e., other than sheets).

In aspects, the glass composition may have a liquidus temperature greater than or equal to 900° C., greater than or equal to 950° C., or even greater than or equal to 1000° C. In aspects, the glass composition may have a liquidus temperature less than or equal to 1300° C., less than or equal to 1250° C., or even less than or than or equal to 1000° C. In aspects, the glass composition may have a liquidus temperature greater than or equal to 900° C. and less than or equal to 1300° C., greater than or equal to 900° C. and less than or equal to 1250° C., greater than or equal to 900° C. and less than or equal to 1200° C., greater than or equal to 950° C. and less than or equal to 1300° C., greater than or equal to 950° C. and less than or equal to 1250° C., greater than or equal to 950° C. and less than or equal to 1200° C., greater than or equal to 1000° C. and less than or equal to 1300° C., greater than or equal to 1000° C. and less than or equal to 1250° C., or even greater than or equal to 1000° C. and less than or equal to 1200° C., or any and all sub-ranges formed from any of these endpoints.

In aspects, the glass composition may have a density greater than or equal to 2.2 g/cm³ or even greater than or equal to 2.3 g/cm³. In aspects, the glass composition may have a density less than or equal to 2.6 g/cm³ or even greater than or equal to 2.5 g/cm³. In aspects, the glass composition may have a density greater than or equal to 2.2 g/cm³ and less than or equal to 2.6 g/cm³, greater than or equal to 2.2 g/cm³ and less than or equal to 2.5 g/cm³, greater than or equal to 2.3 g/cm³ and less than or equal to 2.6 g/cm³, or even greater than or equal to 2.3 g/cm³ and less than or equal to 2.5 g/cm³, or any and all sub-ranges formed from any of these endpoints.

In aspects, the glass composition may have a CTE greater than or equal to 5 ppm, greater than or equal to 7 ppm, or even greater than or equal to 10 ppm. In aspects, the glass composition may have a CTE less than or equal to 100 ppm, less than or equal to 50 ppm, less than or equal to 25 ppm, or even less than or equal to 15 ppm. In aspects, the glass composition may have a CTE greater than or equal to 5 ppm and less than or equal to 100 ppm, greater than or equal to 5 ppm and less than or equal to 50 ppm, greater than or equal to 5 ppm and less than or equal to 25 ppm, greater than or equal to 5 ppm and less than or equal to 15 ppm, greater than or equal to 7 ppm and less than or equal to 100 ppm, greater than or equal to 7 ppm and less than or equal to 50 ppm, greater than or equal to 7 ppm and less than or equal to 25 ppm, greater than or equal to 7 ppm and less than or equal to 15 ppm, greater than or equal to 10 ppm and less than or equal to 100 ppm, greater than or equal to 10 ppm and less than or equal to 50 ppm, greater than or equal to 10 ppm and less than or equal to 25 ppm, or even greater than or equal to 10 ppm and less than or equal to 15 ppm, or any and all sub-ranges formed from any of these endpoints.

In aspects, the glass composition may have a strain point greater than or equal to 400° C., greater than or equal to 450° C., or even greater than or equal to 500° C. In aspects, the glass composition may have a strain point less than or equal to 750° C., less than or equal to 700° C., or even less than or equal to 650° C. In aspects, the glass composition may have a strain point greater than or equal to 400° C. and less than or equal to 750° C., greater than or equal to 400° C. and less than or equal to 700° C., greater than or equal to 400° C. and less than or equal to 650° C., greater than or equal to 450° C. and less than or equal to 750° C., greater than or equal to 450° C. and less than or equal to 700° C., greater than or equal to 450° C. and less than or equal to 650° C., greater than or equal to 500° C. and less than or equal to 750° C., greater than or equal to 500° C. and less than or equal to 700° C., or even greater than or equal to 500° C. and less than or equal to 650° C., or any and all sub-ranges formed from any of these endpoints.

In aspects, the glass composition may have an annealing point greater than or equal to 450° C., greater than or equal to 500° C., or even greater than or equal to 550° C. In aspects, the glass composition may have an annealing point less than or equal to 850° C., less than or equal to 800° C., or even less than or equal to 750° C. In aspects, the glass composition may have an annealing point greater than or equal to 450° C. and less than or equal to 850° C., greater than or equal to 450° C. and less than or equal to 800° C., greater than or equal to 450° C. and less than or equal to 750° C., greater than or equal to 500° C. and less than or equal to 850° C., greater than or equal to 500° C. and less than or equal to 800° C., greater than or equal to 500° C. and less than or equal to 750° C., greater than or equal to 550° C. and less than or equal to 850° C., greater than or equal to 550° C. and less than or equal to 800° C., or even greater than or equal to 550° C. and less than or equal to 750° C., or any and all sub-ranges formed from any of these endpoints.

In aspects, the glass composition may have a Poisson's ratio greater than or equal to 0.18 or even greater than or equal to 0.2. In aspects, the glass composition may have a Poisson's ratio less than or equal to 0.29, less than or equal to 0.27, or even less than or equal to 0.25. In aspects, the glass composition may have a Poisson's ratio greater than or equal to 0.18 and less than or equal to 0.29, greater than or equal to 0.18 and less than or equal to 0.27, greater than or equal to 0.18 and less than or equal to 0.25, greater than or equal to 0.2 and less than or equal to 0.29, greater than or equal to 0.2 and less than or equal to 0.27, or even greater than or equal to 0.2 and less than or equal to 0.25, or any and all sub-ranges formed from any of these endpoints.

In aspects, the glass composition may comprise a shear modulus greater than or equal to 15 GPa, greater than or equal to 20 GPa, or even greater than or equal to 25 GPa. In aspects, the glass composition may comprise a shear modulus less than or equal to 40 GPa, less than or equal to 35 GPa, or even less than or equal to 30 GPa. In aspects, the glass composition may comprise a shear modulus greater than or equal to 15 GPa and less than or equal to 40 GPa, greater than or equal to 15 GPa and less than or equal to 35 GPa, greater than or equal to 15 GPa and less than or equal to 30 GPa, greater than or equal to 20 GPa and less than or equal to 40 GPa, greater than or equal to 20 GPa and less than or equal to 35 GPa, greater than or equal to 20 GPa and less than or equal to 30 GPa, greater than or equal to 25 GPa and less than or equal to 40 GPa, greater than or equal to 25 GPa and less than or equal to 35 GPa, or even greater than or equal to 25 GPa and less than or equal to 30 GPa, or any and all sub-ranges formed from any of these endpoints.

In aspects, the glass composition may have an SOC greater than or equal to 2 nm/mm/MPa or even greater than or equal to 2.5 nm/mm/MPa. In aspects, the glass composition may have an SOC less than or equal to 4 nm/mm/MPa or even greater than or equal to 3.5 nm/mm/MPa. In aspects, the glass composition may have an SOC greater than or equal to 2 nm/mm/MPa and less than or equal to 4 nm/mm/MPa, greater than or equal to 2 nm/mm/MPa and less than or equal to 3.5 nm/mm/MPa, greater than or equal to 2.5 nm/mm/MPa and less than or equal to 4 nm/mm/MPa, or even greater than or equal to 2.5 nm/mm/MPa and less than or equal to 3.5 nm/mm/MPa, or any and all sub-ranges formed from any of these endpoints.

In aspects, the glass composition may have a refractive index greater than or equal to 1.4 or even greater than or equal to 1.45. In aspects, the glass composition may have a refractive index less than or equal to 1.6 or even less than or equal to 1.55. In aspects, the glass composition may have a refractive index greater than or equal to 1.4 and less than or equal to 1.6, greater than or equal to 1.4 and less than or equal to 1.55, greater than or equal to 1.45 and less than or equal to 1.6, greater than or equal to 1.45 and less than or equal to 1.55, or any and all sub-ranges formed from any of these endpoints.

In aspects, the glass composition may have a VFT A greater than or equal to −5 and less than or equal to −1, a VFT B greater than or equal to 8500 and less than or equal to 9700, and a VFT To greater than or equal to −40 and less than or equal to 200.

In aspects, the glass composition may have a 200 Poise temperature greater than or equal to 1400° C. or even greater than or equal to 1500° C. In aspects, the glass composition may have a 200 Poise temperature less than or equal to 1750° C. or even greater than or equal to 16500° C. In aspects, the glass composition may have a 200 Poise temperature greater than or equal to 1400° C. and less than or equal to 1750° C., greater than or equal to 1400° C. and less than or equal to 1650° C., greater than or equal to 1500° C. and less than or equal to 1750° C., or even greater than or equal to 1500° C. and less than or equal to 1650° C., or any and all sub-ranges formed from any of these endpoints.

In aspects, the glass composition may have a 35 k Poise temperature greater than or equal to 1000° C. or even greater than or equal to 1100° C. In aspects, the glass composition may have a 35 k Poise temperature less than or equal to 1400° C. or even less than or equal to 1300° C. In aspects, the glass composition may have a 35 k Poise temperature greater than or equal to 1000° C. and less than or equal to 1400° C., greater than or equal to 1000° C. and less than or equal to 1300° C., greater than or equal to 1200° C. and less than or equal to 1400° C., or even greater than or equal to 1200° C. and less than or equal to 1300° C., or any and all sub-ranges formed from any of these endpoints.

In aspects, the glass composition may have a 100 k Poise temperature greater than or equal to 900° C. or even greater than or equal to 1000° C. In aspects, the glass composition may have a 100 k Poise temperature less than or equal to 1300° C. or even less than or equal to 1200° C. In aspects, the glass composition may have a 100 k Poise temperature greater than or equal to 900° C. and less than or equal to 1300° C., greater than or equal to 900° C. and less than or equal to 1200° C., greater than or equal to 1000° C. and less than or equal to 1300° C., or even greater than or equal to 1000° C. and less than or equal to 1200° C., or any and all sub-ranges formed from any of these endpoints.

In aspects, the glass composition may have a 200 k Poise temperature greater than or equal to 900° C. or even greater than or equal to 1000° C. In aspects, the glass composition may have a 200 k Poise temperature less than or equal to 1300° C. or even less than or equal to 1200° C. In aspects, the glass composition may have a 200 k Poise temperature greater than or equal to 900° C. and less than or equal to 1300° C., greater than or equal to 900° C. and less than or equal to 1200° C., greater than or equal to 1000° C. and less than or equal to 1300° C., or even greater than or equal to 1000° C. and less than or equal to 1200° C., or any and all sub-ranges formed from any of these endpoints.

In aspects, the process for making a glass article includes heat treating the glass composition at one or more preselected temperatures for one or more preselected times to induce glass homogenization. In aspects, the heat treatment for making a glass article may include (i) heating a glass composition at a rate of 1-100° C./min to glass homogenization temperature; (ii) maintaining the glass composition at the glass homogenization temperature for a time greater than or equal to 0.25 hour and less than or equal to 4 hours to produce a glass article; and (iii) cooling the formed glass article to room temperature. In aspects, the glass homogenization temperature may be greater than or equal to 300° C. and less than or equal to 700° C.

In aspects, the glass compositions described herein are ion-exchangeable to facilitate strengthening the glass article made from the glass compositions. In typical ion-exchange processes, smaller metal ions in the glass compositions are replaced or "exchanged" with larger metal ions of the same valence within a layer that is close to the outer surface of the glass article made from the glass composition. The replacement of smaller ions with larger ions creates a compressive stress within the layer of the glass article made from the glass composition. In aspects, the metal ions are monovalent metal ions (e.g., $Li^+$, $Na^+$, $K^+$, and the like), and ion-exchange is accomplished by immersing the glass article made from the glass composition in a bath comprising at least one molten salt of the larger metal ion that is to replace the smaller metal ion in the glass article. Alternatively, other monovalent ions such as $Ag^+$, $Tl^+$, $Cu^+$, and the like may be exchanged for monovalent ions. The ion-exchange process or processes that are used to strengthen the glass article made from the glass composition may include, but are not limited to, immersion in a single bath or multiple baths of like or different compositions with washing and/or annealing steps between immersions.

Upon exposure to the glass composition, the ion-exchange solution (e.g., $KNO_3$ and/or $NaNO_3$ molten salt bath) may, according to aspects, be at a temperature greater than or equal to 350° C. and less than or equal to 480° C., greater than or equal to 360° C. and less than or equal to 450° C., greater than or equal to 370° C. and less than or equal to 440° C., greater than or equal to 360° C. and less than or equal to 420° C., greater than or equal to 370° C. and less than or equal to 400° C., greater than or equal to 375° C. and less than or equal to 475° C., greater than or equal to 400° C. and less than or equal to 480° C., greater than or equal to 410° C. and less than or equal to 480° C., greater than or equal to 420° C. and less than or equal to 480° C., greater than or equal to 430° C. and less than or equal to 470° C., or even greater than or equal to 440° C. and less than or equal to 460° C., or any and all sub-ranges between the foregoing values. In aspects, the glass composition may be exposed to the ion-exchange solution for a duration greater than or equal to 0.1 hour and less than or equal to 2 hours, greater than or equal to 0.1 hours and less than or equal to 1.5 hours, greater than or equal to 0.1 hours and less than or equal to 1 hour, greater than or equal to 0.5 hour and less than or equal to 2 hours, greater than or equal to 0.5 hours and less than or equal to 1.5 hours, or even greater than or equal to 0.5 hours and less than or equal to 1 hour, or any and all sub-ranges between the foregoing values.

Referring now to FIG. 1, a planar, ion-exchanged glass article is shown at 100. Glass article 100 has a thickness L, a first surface 110, and a second surface 112. The glass articles formed from the glass compositions described herein may be any suitable thickness, which may vary depending on the particular application for use of the glass composition. In aspects, the glass article 100 may have a thickness L greater than or equal to 10 μm and less than or equal to 500 μm, greater than or equal to 10 μm and less than or equal to 400 μm, greater than or equal to 10 μm and less than or equal to 300 μm, greater than or equal to 10 μm and less than or equal to 200 μm, greater than or equal to 10 μm and less than or equal to 100 μm, greater than or equal to 25 μm and less than or equal to 500 µm, greater than or equal to 25 µm and less than or equal to 400 µm, greater than or equal to 25 µm and less than or equal to 300 µm, greater than or equal to 25 µm and less than or equal to 200 µm, greater than or equal to 25 µm and less than or equal to 100 µm, greater than or equal to 35 µm and less than or equal to 500 µm, greater than or equal to 35 µm and less than or equal to 400 µm, greater than or equal to 35 µm and less than or equal to 300 µm, greater than or equal to 35 µm and less than or equal to 200 µm, or even greater than or equal to 35 µm and less than or equal to 100 µm, or any and all sub-ranges formed from any of these endpoints. While the aspect shown in FIG. 1 depicts glass article 100 as a flat, planar sheet or plate, the glass article may have any other suitable configuration, for example, three dimensional shapes or non-planar configurations.

Ion-exchanged glass article 100 has a first compressive layer 120 extending from first surface 110 to a depth of compression $d_1$ into the bulk of the glass article 100. In the aspect shown in FIG. 1, glass article 100 also has a second compressive layer 122 extending from second surface 112 to a second depth of compression $d_2$. Glass article 100 also has a central region 130 that extends from $d_1$ to $d_2$. Central region 130 is under a tensile stress or central tension (CT), which balances or counteracts the compressive stresses of layers 120 and 122. The depth $d_1$, $d_2$ of the first and second compressive layer 120, 122 protects the glass article 100 from the propagation of flaws introduced by sharp impact to first and second surfaces 110, 112 of glass article 100, while the compressive stress minimizes the likelihood of a flaw penetrating through the depth $d_1$, $d_2$ of the first and second compressive layers 120, 122.

As described herein, the glass articles described herein may have a relatively high compressive stress (e.g., greater than or equal to 500 MPa), which allows the glass article to retain net compression and, thus, contain surface flaws when the glass article is subjected to bending. In aspects, the glass article may have a peak compressive stress greater than or equal to 500 MPa and less than or equal to 1100 MPa. In aspects, the glass article may have a peak compressive stress greater than or equal to 550 MPa and less than or equal to 1050. In aspects, the glass article may have a peak compressive stress greater than or equal to 500 MPa, greater than or equal to 550 MPa, greater than or equal to 600 MP, or even greater than or equal to 650 MPa. In aspects, the glass article may have a peak compressive stress less than or equal to 1100 MPa, less than or equal to 1050 MPa, less than or equal to 1000 MPa, or even less than or equal to 950 MPa. In aspects, the glass article may have a peak compressive stress greater than or equal to 500 MPa and less than or equal to 1100 MPa, greater than or equal to 500 MPa and less than or equal to 1050 MPa, greater than or equal to 500 MPa and less than or equal to 1000 MPa, greater than or equal to 500 MPa and less than or equal to 950 MPa, greater than or equal to 550 MPa and less than or equal to 1100 MPa, greater than or equal to 550 MPa and less than or equal to 1050 MPa, greater than or equal to 550 MPa and less than or equal to 1000 MPa, greater than or equal to 550 MPa and less than or equal to 950 MPa, greater than or equal to 600 MPa and less than or equal to 1100 MPa, greater than or equal to 600 MPa and less than or equal to 1050 MPa, greater than or equal to 600 MPa and less than or equal to 1000 MPa, greater than or equal to 600 MPa and less than or equal to 950 MPa, greater than or equal to 650 MPa and less than or equal to 1100 MPa, greater than or equal to 650 MPa and less than or equal to 1050 MPa, greater than or equal to 650 MPa and less than or equal to 1000 MPa, or even greater than or equal to 650 MPa and less than or equal to 950 MPa, or any and all sub-ranges formed from any of these endpoints.

As described herein, glass articles formed from the low-modulus glass compositions described herein may be ion-exchanged to impart a relatively high compressive stress, thereby achieving a relatively high CS/E ratio (e.g., greater than or equal to 13) such that the glass articles remain flexible even after ion-exchange. In aspects, the glass article may have a ratio of peak compressive stress to Young's modulus greater than or equal to 13. In aspects, the glass article may have a ratio of peak compressive stress to Young's modulus greater than or equal to 13.5. In aspects, the glass article may have a ratio of peak compressive stress to Young's modulus greater than or equal to 13, greater than or equal to 13.5, or even greater than or equal to 14. In aspects, the glass article may have a ratio of peak compressive stress to Young's modulus less than or equal to 17 or even less than or equal to 16. In aspects, the glass article may have a ratio of peak compressive stress to Young's modulus greater than or equal to 13 and less than or equal to 17, greater than or equal to 13 and less than or equal to 16, greater than or equal to 13.5 and less than or equal to 17, greater than or equal to 13.5 and less than or equal to 16, greater than or equal to 14 and less than or equal to 17, or even greater than or equal to 14 and less than or equal to 16, or any and all sub-ranges formed from any of these endpoints.

In aspects, a glass article made from the glass composition and having a thickness greater than or equal to 35 µm and less than or equal to 200 µm may be ion-exchanged to achieve a depth of compression greater than or equal to 5 µm, greater than or equal to 7 µm, greater than or equal to 10 µm, greater than or equal to 15 µm, or even greater than or equal to 20 µm. In aspects, a glass article made from the glass composition and having a thickness greater than or equal to 35 µm and less than or equal to 400 µm may be ion-exchanged to achieve a depth of compression less than or equal to 40 µm, less than or equal to 35 µm, or even less than or equal to 30 µm. In aspects, a glass article made from the glass composition and having a thickness greater than or equal to 35 µm and less than or equal to 400 µm may be ion-exchanged to achieve a depth of compression greater than or equal to 5 µm and less than or equal to 40 µm, greater than or equal to 5 µm and less than or equal to 35 µm, greater than or equal to 5 µm and less than or equal to 30 µm, greater than or equal to 7 µm and less than or equal to 40 µm, greater than or equal to 7 µm and less than or equal to 35 µm, greater than or equal to 7 µm and less than or equal to 30 µm, greater than or equal to 10 µm and less than or equal to 40 µm, greater than or equal to 10 µm and less than or equal to 35 µm, greater than or equal to 10 µm and less than or equal to 30 µm, greater than or equal to 15 µm and less than or equal to 40 µm, greater than or equal to 15 µm and less than or equal to 35 µm, greater than or equal to 15 µm and less than or equal to 30 µm, greater than or equal to 20 µm and less than or equal to 40 µm, greater than or equal to 20 µm and less than or equal to 35 µm, or even greater than or equal to 20 µm and less than or equal to 30 µm, or any and all sub-ranges formed from any of these endpoints.

In aspects, a glass article made from the glass composition may be ion-exchanged to achieve a depth of compression greater than or equal to 5% or even greater than or equal to 10% of a thickness of the glass article. In aspects, a glass article made from the glass composition may be ion-exchanged to achieve a depth of compression less than or equal to 20% or even less than or equal to 15% of a thickness of the glass article. In aspects, a glass article made from the glass composition may be ion-exchanged to achieve a depth of compression greater than or equal to 5% and less than or equal to 20%, greater than or equal to 5% and less than or equal to 15%, greater than or equal to 10% and less than or equal to 20%, or even greater than or equal to 10% and less than or equal to 15%, or any and all sub-ranges formed from any of these endpoints, or a thickness of the glass article.

The relatively low Young's modulus of the glass compositions described herein may lead to a reduced central tension, which prevents fragmentation of the glass article into small pieces during bending. In aspects, the glass article made from the glass composition may have a central tension after ion-exchange strengthening greater than or equal to 250 MPa, greater than or equal to 350 MPa, or even greater than or equal to 450 MPa. In aspects, the glass article made from the glass composition may have a central tension after ion-exchange strengthening less than or equal to 650 MPa, less than or equal to 600 MPa, or even less than or equal to 550 MPa. In aspects, the glass article made from the glass composition may have a central tension after ion-exchange strengthening greater than or equal to 250 MPa and less than or equal to 650 MPa, greater than or equal to 250 MPa and less than or equal to 600 MPa, greater than or equal to 250 MPa and less than or equal to 550 MPa, greater than or equal to 350 MPa and less than or equal to 650 MPa, greater than or equal to 350 MPa and less than or equal to 600 MPa, greater than or equal to 350 MPa and less than or equal to 550 MPa, greater than or equal to 450 MPa and less than or equal to 650 MPa, greater than or equal to 450 MPa and less than or equal to 600 MPa, or even greater than or equal to 450 MPa and less than or equal to 550 MPa, or any and all sub-ranges formed from any of these endpoints.

The relatively low Young's modulus of the glass compositions described herein and the high peak compressive stress that may be achieved by ion-exchange provides for the formation of ion-exchanged glass articles capable of bending to a tighter (i.e., smaller) bend radius for a given glass thickness.

The inter-diffusion coefficient D for a glass article is calculated using the following equation:

$$DOC = \sqrt{4D \cdot t} \tag{1}$$

where t is the ion-exchange time in hours. The slope of DOC versus $\sqrt{t}$ gives the value of $\sqrt{(4D)}$. Once D is known, the ion-exchange time needed for DOC to reach 0.2*L (L being the thickness of the glass article) may be calculated.

As described herein, the glass compositions described herein may be used to produce glass articles that require a shorter ion-exchange time to produce a desired DOC. This helps to maintain a high CS because there will be less stress relaxations during the ion-exchange process. Stress relaxation time (τ) at the ion-exchange temperature may be determined by glass viscosity (η) at the temperature (T) and shear modulus (G) of the glass according to the following equation:

$$\tau = \frac{\eta(T)}{G} \tag{2}$$

If the strain point is more than 100° C. higher than the ion-exchange temperature, the stress relaxation time may be more than 10 magnitude longer than the ion-exchange time, which may minimize the stress relaxation.

Figure 2:
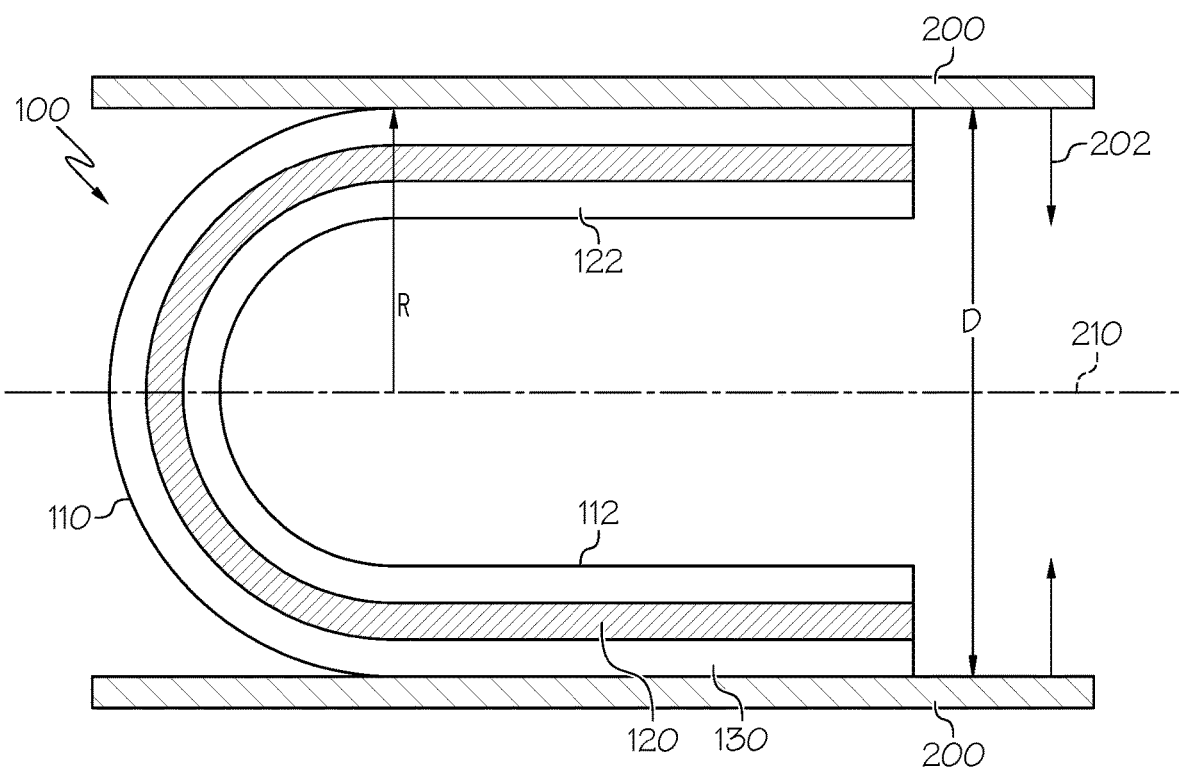
FIG. 2 is a cross-sectional, schematic view of a glass article under bend-induced stress.

Referring now to FIG. 2, the ion-exchanged glass article 100 is under bend-induced stress. When bent along a fold line 210 with a bend force 202 to a particular bend radius R or to a particular platen distance D, the outer surface 110 (i.e., first surface) of the ion-exchanged glass article 100 is subjected to a tensile stress, induced by the bend, which causes the depth of compression of the compressive layer on the outer surface 110 to decrease to an effective depth of compression, while the inner surface 112 (i.e., second surface) is subjected to additional compressive stress.

When bending an ion-exchanged glass article, the maximum bend-induced tensile stress is given by the equation:

$$\sigma_{max} = \frac{E}{1 - v^2} \cdot \frac{L}{2} \cdot \frac{1}{R} \tag{3}$$

where $\sigma_{max}$ is the tensile stress on the outer surface of the glass article, E is the Young's modulus of the glass article, v is the Poisson's ratio of the glass article, L is the thickness of the glass article, and R is the bend radius of the outer surface of the glass article. The bend-induced tensile stress may be calculated for various bend radii R by using the Young's modulus and Poisson's ratios (which are dependent upon glass composition and not upon radius). The bend-induced stress may also be calculated for various platen distances D by using the following equation:

$$D - L = 2.396R \tag{4}$$

where D is platen separation, L is the thickness of the glass article, and R is the bend radius of the outer surface of the glass article.

Figure 3:
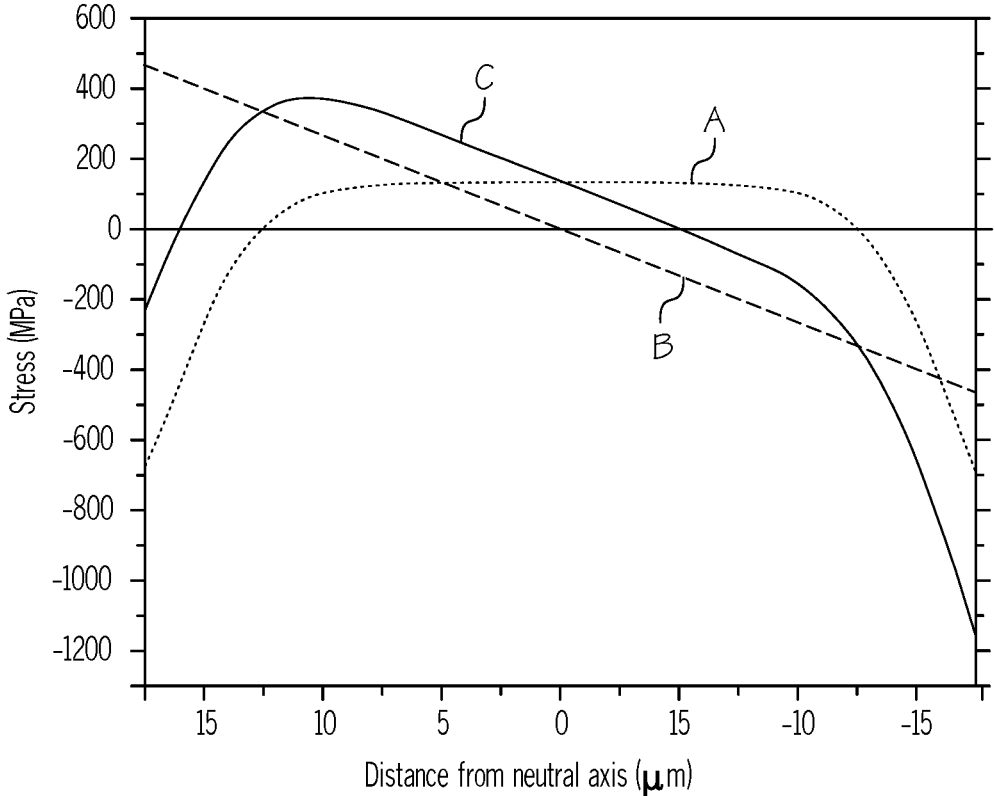
FIG. 3 is a plot showing superposition of ion-exchange and bend-induced stresses in a glass article under bend-induced stress.

The bend-induced tensile stress may be superimposed with the ion-exchanged stress to yield the net stress profile that exists in the glass article when it is in a bent state (which has an effective depth of compression at the outer surface) for a given platen distance D. FIG. 3 shows the superposition of these stresses determined for a 35 μm thick glass article composed of example glass composition E7 as given in Table 1. As shown in FIG. 3, compressive stress is negative (<0) and tensile stress is positive (>0). Ion-exchanged stress (A), bend-induced tensile stress (B), and the net stress (C) as a function of distance from the neutral axis are plotted. The effective depth of compression is the depth at which the stress within the glass article changes from compressive to tensile (i.e., where the net stress (C) intercepts "0" on the y-axis).

The outer surface of the glass article was bent to a platen distance D of 6 mm (R=2.49 mm), at which point the effective depth of compression at the outer surface is 1.5 μm. The plot of ion-exchanged stress (A) follows a complementary error function, and has a maximum compressive stress of 712 MPa and a depth of compression of 5 μm. The plot of bend-induced stress B is linear with distance from the outer to the inner surface and is zero at half the glass article thickness (i.e., at a value of 0 μm on the x-axis, meaning at the neutral axis). The superposition of these stresses, the net stress (C), goes from a value of −200 MPa at the outer surface of the glass article to a value of 0 MPa at a distance of 1.5 μm from the outer surface toward the neutral axis.

This shows that, for a platen distance of 6 mm, the effective depth of compression on the outer surface of the glass article is reduced to 1.5 µm.

Figure 4:
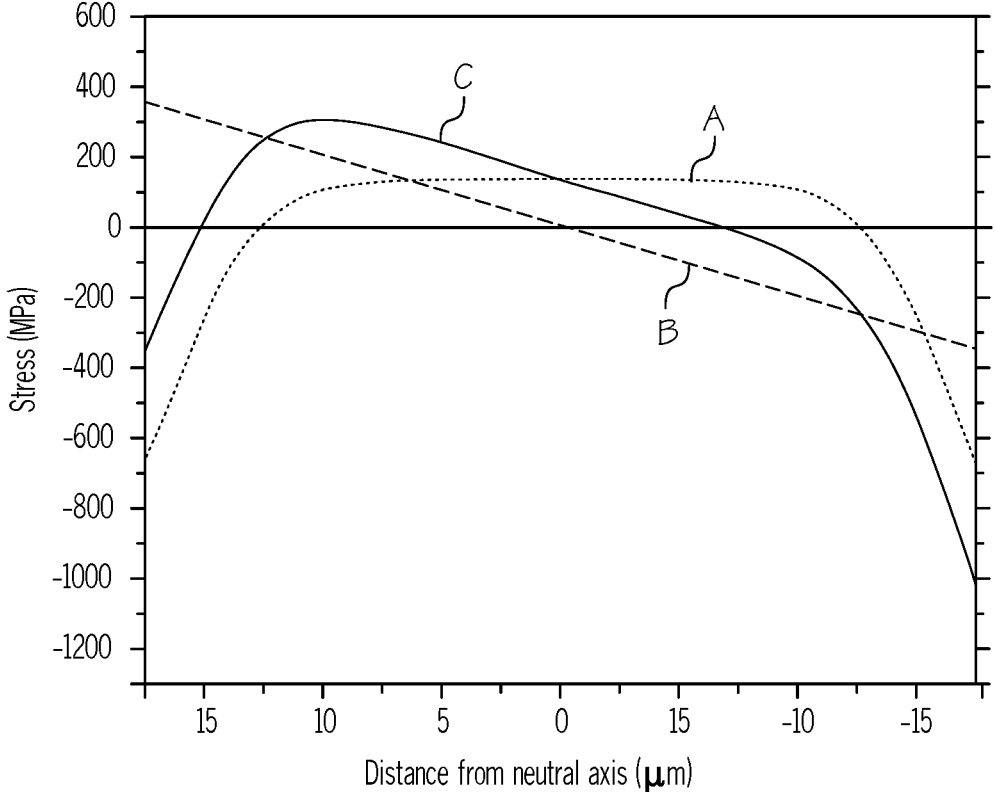
FIG. 4 is a plot showing superposition of ion-exchange and bend-induced stresses in a glass article under bend-induced stress.

The effective depth of compression on the outer surface 110 increases with increasing bend radii or platen distance and decreases with decreasing bend radii or platen distance. For example, FIG. 4 shows the superposition of stresses determined for a 35 µm thick glass article composed of example glass composition E7 as given in Table 1 and the outer surface thereof bent to platen distance D of 8 mm. When the platen distance D is 8 mm, the effective depth of compression at the outer surface is 2.2 µm, which is greater than the 1.5 µm effective depth of compression when the platen distance D is 6 mm as shown in FIG. 3.

For the inner surface (i.e., at a value of −17.5 µm on the x-axis), the net stress (C) goes from a value of −1100 MPa at the inner surface to a value of 0 MPa at a distance of 12.4 µm from the inner surface toward the neutral axis. This shows that, for a platen distance of 6 mm as shown in FIG. 3, the effective depth of compression on the inner surface of the glass article is reduced to 12.4 µm.

In aspects, an ion-exchanged glass article having an article thickness of 35 µm and bent to a platen spacing of 6 mm may have a maximum central tension of the bent glass article that may be greater than or equal to 350 MPa and less than or equal to 475 MPa. For example, as shown in FIG. 3, maximum central tension of the glass article is the maximum value or peak of the net stress (C), which is 373 MPa.

The bending forces applied to the glass article may also result in the potential for crack propagation leading to instantaneous or slower, fatigue failure mechanisms. The presence of flaws at the outer surface 110, or just beneath the surface, of the glass article can contribute to these potential failure modes. Using Equation (5) below, it is possible to estimate the stress intensity factor in a glass article subjected to bending forces. Equation (5) is given by:

$$K_I = \Omega \cdot (\sigma_{IOX\ stress\ profile\ at\ depth\ a} + \sigma_{bend\ induced\ at\ depth\ a}) \cdot (\pi a)^{0.5} \quad (5)$$

where $K_I$ is the mode I stress intensity, which refers to crack opening), $\Omega$ is the shape factor for the flaw geometry, $\sigma_{IOX\ stress\ profile\ at\ depth\ a}$ is the stress due to ion-exchange at depth a, $\sigma_{bend\ induced\ at\ depth\ a}$ is the stress due to bending at depth a, and a is the flaw depth. The static fatigue limit expected from sodium-containing glasses is 0.5 MPa·m$^{0.5}$ (*Journal of Materials Science*, 26 (1991) 5445-5455). Any stress intensity level lower than the static fatigue limit will not exhibit slow crack growth. Therefore, the glass will not fail due to slow crack growth.

Figure 5:
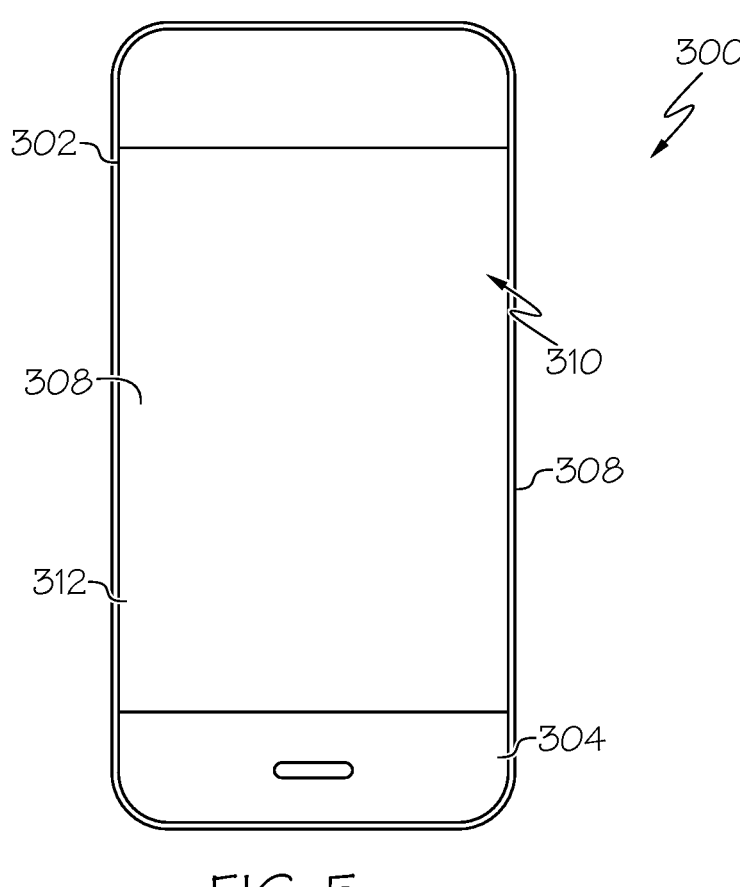
FIG. 5 is a plan view of an electronic device incorporating any of the glass articles according to one or more aspects described herein.
Figure 6:
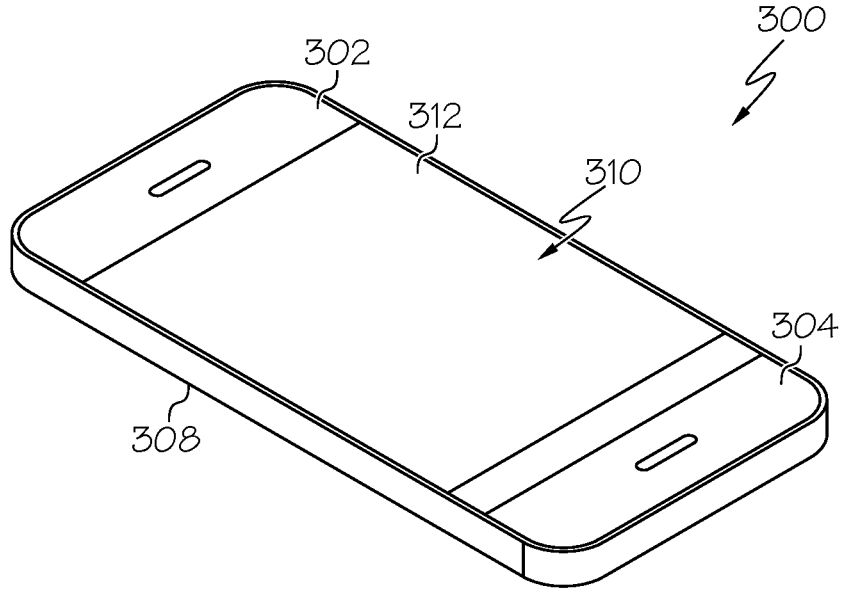
FIG. 6 is a perspective view of the electronic device of FIG. 4.

The glass articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that may benefit from some transparency, scratch-resistance, abrasion resistance or a combination thereof. An exemplary article incorporating any of the glass articles disclosed herein is shown in FIGS. 5 and 6. Specifically, FIGS. 5 and 6 show a consumer electronic device 300 including a housing 302 having front 304, back 306, and side surfaces 308; electrical components (not shown) that are at least partially inside or entirely within the housing and including at least a controller, a memory, and a display 310 at or adjacent to the front surface of the housing; and a cover substrate 312 at or over the front surface of the housing such that it is over the display. In some aspects, at least one of the cover substrate 312 or a portion of housing 302 may include any of the glass articles disclosed herein.

EXAMPLES

In order that various aspects be more readily understood, reference is made to the following examples, which are intended to illustrate various aspects of the glass compositions described herein.

Table 1 shows glass compositions (in terms of mol %) and the respective properties of the glass compositions. Glass articles are formed having the comparative glass compositions C1-C7 and example glass compositions E1-E7.

TABLE 1

| Example | C1 | C2 | C3 | C4 | C5 | C6 |
|---|---|---|---|---|---|---|
| SiO₂ | 68.95 | 48.73 | 54.63 | 55.82 | 50.08 | 50.86 |
| Al₂O₃ | 10.27 | 22.45 | 20.11 | 20.12 | 20.24 | 22.13 |
| B₂O₃ | — | 8.76 | 4.81 | 4.81 | 9.50 | 4.83 |
| P₂O₅ | — | — | 4.88 | 4.83 | 4.91 | 6.80 |
| Na₂O | 15.2 | 16.06 | 15.53 | 14.38 | 15.24 | 15.34 |
| K₂O | — | 3.95 | — | — | — | — |
| MgO | 5.36 | — | — | — | — | — |
| CaO | 0.06 | — | — | — | — | — |
| SnO₂ | 0.17 | — | — | — | — | — |
| R₂O | 15.20 | 20.01 | 15.53 | 14.38 | 15.24 | 15.34 |
| RO | 5.42 | — | — | — | — | — |
| R2O/Al₂O₃ | 1.48 | 0.89 | 0.77 | 0.71 | 0.75 | 0.69 |
| (R₂O + P₂O₅)/Al₂O₃ | 1.48 | 0.89 | 1.01 | 0.95 | 1.00 | 1.00 |
| B₂O₃ + P₂O₅ + K₂O | 0.00 | 12.71 | 9.69 | 9.64 | 14.41 | 11.63 |
| Young's Modulus (GPa) | 71.2 | 66.3 | 63.3 | 63.8 | 59.9 | 62.8 |
| Density (g/cm³) | 2.432 | 2.429 | 2.388 | 2.382 | 2.367 | 2.386 |
| CTE (ppm) | 8.14 | 10.1 | 7.68 | 7.27 | 7.67 | 7.44 |
| Strain Pt. (° C.) | 599.0 | 577.0 | 607.3 | 615.3 | 553.4 | 577.6 |
| Anneal Pt. (° C.) | 652.0 | 630.3 | 664.6 | 672.5 | 605.8 | 632.2 |
| Poisson's ratio | 0.205 | 0.232 | 0.210 | 0.213 | 0.226 | 0.213 |
| Shear modulus (GPa) | 29.6 | 26.9 | 26.1 | 26.3 | 24.4 | 25.9 |
| SOC (nm/mm/MPa) | 2.970 | 3.325 | 3.416 | 3.440 | 3.625 | 3.405 |
| Refractive index | 1.499 | 1.507 | 1.493 | 1.493 | 1.493 | 1.493 |
| VFT A | −2.15 | −3.59 | −3.83 | −3.62 | −3.41 | −4.25 |
| VFT B | 6405.00 | 8162.41 | 8946.00 | 8599.12 | 7767.58 | 9667.20 |

TABLE 1-continued

| | | | | | | |
|---|---|---|---|---|---|---|
| VFT $T_o$ | 232.00 | 148.07 | 143.98 | 166.40 | 142.76 | 80.34 |
| 200 Poise temperature (° C.) | 1671 | 1534 | 1602 | 1618 | 1503 | 1556 |
| 35k Poise temperature (° C.) | 1189 | 1152 | 1212 | 1219 | 1120 | 1180 |
| 100k Poise temperature (° C.) | 1128 | 1098 | 1157 | 1164 | 1067 | 1126 |
| 200k Poise temperature (° C.) | 1092 | 1066 | 1123 | 1130 | 1035 | 1093 |
| Liquidus temperature (° C.) | 1020 | >1290 | >1255 | >1305 | 1165 | >1310 |
| Liquidus viscosity (kP) | 949.81 | <3.686 | <16.517 | <8.493 | 15.510 | <4.106 |

| Example | C7 | E1 | E2 | E3 | E4 | E5 |
|---|---|---|---|---|---|---|
| $SiO_2$ | 48.93 | 50.58 | 50.82 | 53.82 | 51.80 | 52.05 |
| $Al_2O_3$ | 22.18 | 20.03 | 20.35 | 20.10 | 22.08 | 22.14 |
| $B_2O_3$ | 6.72 | 9.71 | 8.58 | — | — | 2.31 |
| $P_2O_5$ | 6.84 | — | — | 4.79 | 4.83 | 2.38 |
| $Na_2O$ | 15.28 | 14.78 | 16.06 | 16.68 | 16.64 | 16.61 |
| $K_2O$ | — | 4.86 | 4.15 | 4.58 | 4.61 | 4.46 |
| MgO | — | — | — | — | — | — |
| CaO | — | — | — | — | — | — |
| $SnO_2$ | — | — | — | — | — | — |
| RO | — | — | — | — | — | — |
| $R_2O$ | 15.28 | 19.64 | 20.21 | 21.26 | 21.25 | 21.07 |
| $R2O/Al_2O_3$ | 0.69 | 0.98 | 0.99 | 1.06 | 0.96 | 0.95 |
| $(R_2O + P_2O_5)/Al_2O_3$ | 1.00 | 0.98 | 0.99 | 1.30 | 1.18 | 1.06 |
| $B_2O_3 + P_2O_5 + K_2O$ | 13.56 | 14.57 | 12.73 | 9.37 | 9.44 | 9.15 |
| Young's Modulus (GPa) | 61.6 | 63.4 | 65.1 | 67.3 | 68.3 | 68.9 |
| Density (g/cm³) | 2.378 | 2.411 | 2.422 | 2.45 | 2.454 | 2.453 |
| CTE (ppm) | 7.45 | 10.6 | 10.6 | 11.2 | 10.8 | 10.7 |
| Strain Pt. (° C.) | 603.6 | 540.0 | 555.0 | 646.0 | 663.0 | 640.0 |
| Anneal Pt. (° C.) | 658.7 | 592.7 | 608.7 | 702.7 | 720.1 | 698.4 |
| Poisson's ratio | 0.221 | 0.235 | 0.232 | 0.213 | 0.215 | 0.217 |
| Shear modulus (GPa) | 25.2 | 25.6 | 26.4 | 27.7 | 28.1 | 28.3 |
| SOC (nm/mm/MPa) | 3.508 | 3.473 | 3.373 | 2.977 | 2.967 | 3.075 |
| Refractive index | 1.492 | 1.503 | 1.504 | 1.499 | 1.500 | 1.504 |
| VFT A | −3.05 | −4.01 | −3.77 | −3.85 | −4.18 | −4.10 |
| VFT B | 6824.00 | 9395.57 | 8796.24 | 9238.03 | 9502.79 | 9289.66 |
| VFT $T_o$ | 247.00 | 47.55 | 93.20 | 163.94 | 176.85 | 166.43 |
| 200 Poise temperature (° C.) | 1522 | 1537 | 1541 | 1666 | 1642 | 1617 |
| 35k Poise temperature (° C.) | 1146 | 1146 | 1151 | 1265 | 1265 | 1241 |
| 100k Poise temperature (° C.) | 1095 | 1091 | 1096 | 1208 | 1211 | 1187 |
| 200k Poise temperature (° C.) | 1064 | 1057 | 1063 | 1174 | 1179 | 1154 |
| Liquidus temperature (° C.) | >1310 | 1050 | 1100 | 1075 | 1140 | 1200 |
| Liquidus viscosity (kP) | <2.342 | 232.365 | 92.095 | 1,952.258 | 480.183 | 76.802 |

| Example | E6 | E7 |
|---|---|---|
| $SiO_2$ | 53.84 | 53.72 |
| $Al_2O_3$ | 20.11 | 20.08 |
| $B_2O_3$ | 1.90 | 4.83 |
| $P_2O_5$ | 4.82 | 4.87 |
| $Na_2O$ | 16.59 | 16.45 |
| $K_2O$ | 2.70 | — |
| MgO | — | — |
| CaO | — | — |
| $SnO_2$ | — | — |
| $R_2O$ | — | — |
| RO | 19.29 | 16.45 |
| $R2O/Al_2O_3$ | 0.96 | 0.82 |
| $(R_2O + P_2O_5)/Al_2O_3$ | 1.20 | 1.06 |
| $B_2O_3 + P_2O_5 + K_2O$ | 9.42 | 9.70 |
| Young's Modulus (GPa) | 65.8 | 62.9 |
| Density (g/cm³) | 2.428 | 2.394 |
| CTE (ppm) | 10.0 | 8.15 |
| Strain Pt. (° C.) | 617.0 | 601.1 |
| Anneal Pt. (° C.) | 674.0 | 656.4 |
| Poisson's ratio | 0.216 | 0.219 |
| Shear modulus (GPa) | 27.0 | 25.8 |
| SOC (nm/mm/MPa) | 3.111 | 3.399 |
| Refractive index | 1.497 | 1.494 |
| VFT A | −4.01 | −3.70 |
| VFT B | 9539.14 | 8631.00 |
| VFT $T_o$ | 123.32 | 150.00 |
| 200 Poise temperature (° C.) | 1635 | 1588 |
| 35k Poise temperature (° C.) | 1238 | 1197 |
| 100k Poise temperature (° C.) | 1182 | 1142 |
| 200k Poise temperature (° C.) | 1148 | 1109 |
| Liquidus temperature (° C.) | 1025 | <875 |
| Liquidus viscosity (kP) | 3,707.058 | >159,000 |

As indicated by Table 1, the glass compositions described herein including $B_2O_3$, $P_2O_5$, and/or $K_2O$ have a relatively low Young's modulus such that glass articles formed therefrom may subjected to relatively tighter bending.

Referring now to Table 2, glass articles formed from comparative glass composition C1 and example glass compositions E1-E7 having a length of 2.54 cm, a width of 2.54 cm, and a thickness of 1 mm were immersed in a molten salt bath comprised of 100 wt % $KNO_3$ at 410° C. for the listed time period. The compressive stress CS and depth of compression DOC values listed in Table 2 were measured by FSM. The peak CS/E value listed in Table 2 for each glass article is the highest CS achieved by the glass article after being immersed in the molten salt bath (i.e., the highest CS for a given glass article listed in Table 2) divided by the Young's modulus of the glass composition used to form the glass article.

TABLE 2

| Example | E1 | E2 | E3 | E4 | E5 | E6 | E7 |
|---|---|---|---|---|---|---|---|
| 0.08 hr. (5 min.) | | | | | | | |
| CS (MPa) | 801 | 891 | 824 | 843 | 913 | 879 | 863 |
| DOC (μm) | 9.5 | 10.8 | 23.0 | 20.7 | 17.1 | 15.3 | 8.8 |
| 0.17 hr. (10 min.) | | | | | | | |
| CS (MPa) | 823 | 910 | 879 | 905 | 974 | 913 | 901 |
| DOC (μm) | 13.7 | 13.8 | 29.8 | 27.2 | 22.2 | 21.4 | 11.6 |
| 0.33 hr. (20 min.) | | | | | | | |
| CS (MPa) | 839 | — | — | — | — | — | 908 |
| DOC (μm) | 16.4 | — | — | — | — | — | 15.6 |
| 0.5 hr (30 min) | | | | | | | |
| CS (MPa) | 871 | 926 | 911 | 942 | 991 | 953 | 881 |
| DOC (μm) | 19.8 | 22.8 | 44.7 | 40.4 | 33.7 | 31.7 | 18.4 |
| 1 hr. (60 min) | | | | | | | |
| CS (MPa) | 850 | 906 | 914 | 941 | 992 | 942 | 894 |
| DOC (μm) | 29.1 | 30.7 | 59.7 | 56.4 | 45.5 | 43.8 | 26.5 |
| 2 hr (120 min) | | | | | | | |
| CS (MPa) | 807 | — | — | — | — | — | — |
| DOC (μm) | 42.1 | — | — | — | — | — | — |
| Peak CS/E | 13.7 | 14.2 | 13.6 | 13.8 | 14.4 | 14.5 | 14.4 |

| | Example | | | C1 | | | |
|---|---|---|---|---|---|---|---|
| 2 hr. (120 mi.n) | | | | | | | |
| CS (MPa) | | | | 976 | | | |
| DOC (μm) | | | | 23.4 | | | |
| 4 hr. (240 min.) | | | | | | | |
| CS (MPa) | | | | 954 | | | |
| DOC (μm) | | | | 32.6 | | | |

TABLE 2-continued

| 6 hr. (360 min.) | |
|---|---|
| CS (MPa) | 933 |
| DOC (μm) | 39.4 |
| 8 hr (480 min.) | |
| CS (MPa) | 916 |
| DOC (μm) | 45.7 |
| Peak CS/E | 13.7 |

As shown in Table 2, glass articles formed from example glass compositions E1-E7 were able to achieve a peak CS/E similar to or greater than the peak CS/E of the glass article formed from comparative glass composition 1 in a shorter period of time. As indicated by Table 2, glass articles formed from the low-modulus glass compositions described herein may be ion-exchanged in a relatively short period of time to impart a relative high CS/E ratio.

Figure 7:
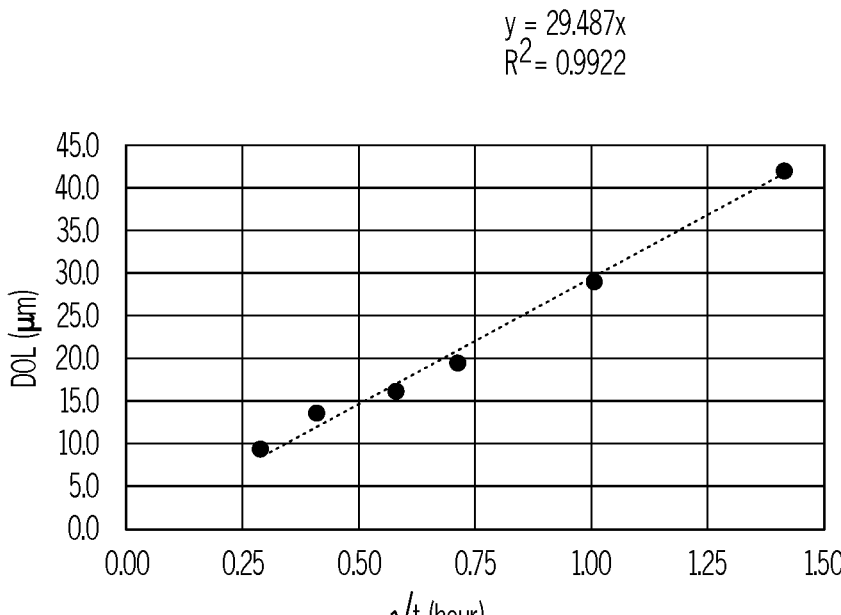
FIG. 7 is a plot of $\sqrt{t}$ vs. DOC (x-axis: $\sqrt{t}$; y-axis: DOC) of a glass article according to one or more aspects described herein.

Referring now to FIG. 7, a plot of √t versus DOC of a glass article formed from example glass composition E1 after being subjected to a molten salt bath comprised of 100 wt % $KNO_3$ at 410° C. is shown. Referring back to Equation (1), the slope, y=29.487x, gives the value of √(4D) and may be used to determine the ion-exchange time needed for DOC to reach 0.2*L (L being the thickness of the glass article). For example, to achieve a DOC of 20 μm, a glass article formed from example glass composition E1 having a thickness of 100 μm would need to be ion-exchanged for 0.46 hour (or √t=0.68).

Figure 8:
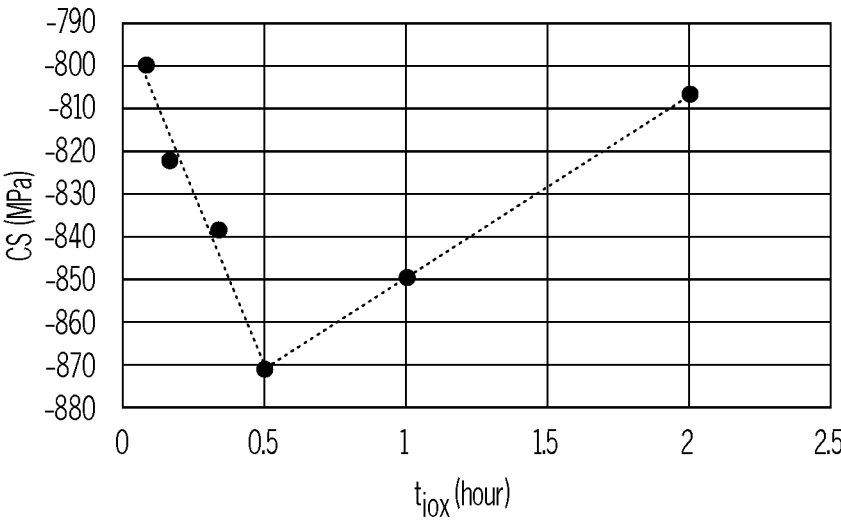
FIG. 8 is a plot of $t_{iox}$ vs. CS (x-axis: $t_{iox}$; y-axis: CS) of a glass article according to one or more aspects described herein.

Referring now to FIG. 8, a plot of t versus CS of a glass article formed from example glass composition E1 after being subjected to a molten salt bath comprised of 100 wt % $KNO_3$ at 410° C. is shown. By linearly extrapolating $t_{iox}$ versus CS, in both the positive and negative slope regions, the CS from an ion-exchange time may be estimated, which would give the disable DOC (i.e., at 20% of the thickness) for a defined thickness.

For example, from FIG. 7, it may be determined that to achieve a DOL of 20 μm, a glass article formed from example glass composition E1 having a thickness of 100 μm would need to be ion-exchanged for 0.46 hour (or √t=0.68). From FIG. 8, it may be determined that the CS would be approximately 870 MPa when $t_{iox}$ is equal to 0.46 hours.

Referring now to Table 3, plots of the ion-exchanged stress, bend-induced tensile stress, and net stress (see, e.g., FIG. 3) for glass articles formed from the compositions shown in Table 1 having the listed thickness and bend radius R were generated. The peak compressive stress CS, the maximum central tension $CT_{max}$, effective depth of compression DOC (i.e., where stress=0), and flaw depth for stress intensity $K_I$=0.5 MPa·m$^{0.5}$ are reported in Table 3. The maximum $CT_{max}$ values are the maximum of the net stress (e.g., the maximum of (C) in FIG. 3). Peak compressive stress CS values generally decrease 10% to 20% from 1 mm thick glass articles to 0.05 mm (i.e., 50 μm) thick glass articles. Stress intensity $K_I$ was calculated using Equation 4.

TABLE 3

| Example | C1 | E1 | E2 | E3 | E4 | E5 |
|---|---|---|---|---|---|---|
| t = 100 μm; R = 4.97 mm | | | | | | |
| $CT_{max}$ (MPa) | 586 | 504 | 520 | 524 | 533 | 547 |
| $CT_{max}/CT_{max}$(C1) | 1 | 0.86 | 0.89 | 0.89 | 0.91 | 0.93 |
| CS (MPa) | 830 | 690 | 744 | 669 | 695 | −85 |
| DOC (μm) | 16.2 | 20 | 20 | 20 | 20 | 20 |
| Effective DOC (μm) (Stress = 0) | 1 | 0.2 | 0.9 | NA* | NA* | 0.9 |

TABLE 3-continued

| Flaw depth (μm) for KI = 0.5 MPa · m$^{0.5}$ | 2.9 | 3.1 | 3.4 | 2.4 | 2.6 | 3.3 |
|---|---|---|---|---|---|---|
| t = 75 μm; R = 4.14 mm | | | | | | |
| CT$_{max}$ (MPa) | 513 | 457 | 475 | 475 | 483 | 463 |
| CT$_{max}$/CT$_{max}$(C1) | 1 | 0.89 | 0.93 | 0.93 | 0.94 | 0.9 |
| CS (MPa) | 800 | 665 | 738 | 645 | 665 | 739 |
| DOC (μm) | 15.3 | 15 | 15 | 15 | 15 | 15 |
| Effective DOC (μm) (Stress = 0) | 1.5 | 0.8 | 1.5 | 0.1 | 0.2 | 1.6 |
| Flaw depth (μm) for KI = 0.5 MPa · m$^{0.5}$ | 3.3 | 3.0 | 3.4 | 2.6 | 2.6 | 3.5 |
| t = 50 μm; R = 3.32 mm | | | | | | |
| CT$_{max}$ (MPa) | 440 | 391 | 408 | 405 | 412 | 423 |
| CT$_{max}$/CT$_{max}$(C1) | 1 | 0.89 | 0.93 | 0.92 | 0.94 | 0.96 |
| CS (MPa) | 750 | 646 | 716 | 629 | 643 | 707 |
| DOC (μm) | 9.8 | 10 | 10 | 10 | 10 | 10 |
| Effective DOC (μm) (Stress = 0) | 1.5 | 1.4 | 1.7 | 1 | 1 | 1.4 |
| Flaw depth (μm) for KI = 0.5 MPa · m$^{0.5}$ | 2.9 | 3.0 | 3.2 | 2.7 | 2.7 | 2.9 |
| t = 35 μm; R = 2.49 mm | | | | | | |
| CT$_{max}$ (MPa) | 415 | 370 | 385 | 382 | 388 | 399 |
| CT$_{max}$/CT$_{max}$(C1) | 1 | 0.89 | 0.93 | 0.92 | 0.93 | 0.96 |
| CS (MPa) | 750 | 639 | 706 | 622 | 634 | 694 |
| DOC (μm) | 7.1 | 7 | 7 | 7 | 7 | 7 |
| Effective DOC (μm) (Stress = 0) | 1.3 | 1.1 | 1.4 | 0.9 | 0.9 | 1.2 |
| Flaw depth (μm) for KI = 0.5 MPa · m$^{0.5}$ | 2.5 | 2.5 | 2.6 | 2.3 | 2.2 | 2.4 |

| Example | E6 | E7 |
|---|---|---|
| t = 100 μm; R = 4.97 mm | | |
| CT$_{max}$ (MPa) | 521 | 499 |
| CT$_{max}$/CT$_{max}$(C1) | 0.89 | 0.85 |
| CS (MPa) | 739 | 714 |
| DOC (μm) | 20 | 20 |
| Effective DOC (μm) (Stress = 0) | 0.7 | 0.9 |
| Flaw depth (μm) for KI = 0.5 MPa · m$^{0.5}$ | 3.3 | 3.4 |
| t = 75 μm; R = 4.14 mm | | |
| CT$_{max}$ (MPa) | 473 | 457 |
| CT$_{max}$/CT$_{max}$(C1) | 0.92 | 0.89 |
| CS (MPa) | 711 | 717 |
| DOC (μm) | 15 | 15 |
| Effective DOC (μm) (Stress = 0) | 1.1 | 1.6 |
| Flaw depth (μm) for KI = 0.5 MPa · m$^{0.5}$ | 3.2 | 3.5 |
| t = 50 μm; R = 3.32 mm | | |
| CT$_{max}$ (MPa) | 406 | 395 |
| CT$_{max}$/CT$_{max}$(C1) | 0.92 | 0.9 |
| CS (MPa) | 692 | 712 |
| DOC (μm) | 10 | 10 |
| Effective DOC (μm) (Stress = 0) | 1.6 | 1.9 |
| Flaw depth (μm) for KI = 0.5 MPa · m$^{0.5}$ | 3.1 | 3.3 |
| t = 35 μm; R = 2.49 mm | | |
| CT$_{max}$ (MPa) | 384 | 373 |
| CT$_{max}$/CT$_{max}$(C1) | 0.93 | 0.9 |
| CS (MPa) | 683 | 700 |
| DOC (μm) | 7 | 7 |
| Effective DOC (μm) (Stress = 0) | 1.3 | 1.5 |
| Flaw depth (μm) for KI = 0.5 MPa · m$^{0.5}$ | 2.5 | 2.7 |

*"NA" means that the effective DOC is smaller than 0 (i.e., the convex surface is in tension).

As shown in Table 3, glass articles formed from example glass compositions E1-E7 had a relatively reduced $CT_{max}$ as compared to a glass article formed from comparative glass composition C1, which prevents fragmentation of the glass article into small pieces upon being bent.

In addition to having a relatively reduced $CT_{max}$, some of the glass articles were able to withhold a relatively larger flaw size as compared to a glass article formed from comparative glass composition C1, as evidenced by the flaw depth for stress intensity $K_f$=0.5 MPa·m$^{0.5}$, which prevents crack growth and glass failure. At a thickness of 100 μm and a bend radius R of 4.97 mm, glass articles formed from example glass compositions E1, E2, and E5-E7 were able to withhold a larger flaw size than the glass article formed from comparative glass composition C1, while having a relatively reduced central tension $CT_{max}$. At a thickness of 75 μm and a bend radius R of 4.14 mm, glass articles formed from example glass compositions E2, E5, and E7 were able to withhold a larger flaw size than the glass article formed from comparative glass composition C1, while having a relatively reduced central tension $CT_{max}$. At a thickness of 50 μm and a bend radius R of 3.32 mm, glass articles formed from example glass compositions E1, E2, E6, and E7 were able to withhold a larger flaw size than the glass article formed from comparative glass composition C1, while having a relatively reduced central tension $CT_{max}$. At a thickness of 35 μm and a bend radius R of 2.49 mm, glass articles formed from example glass compositions E2 and E7 were able to withhold a larger flaw size than the glass article formed from comparative glass composition C1, while having a relatively reduced central tension $CT_{max}$.

Referring now to Table 4, glass articles formed from comparative glass composition C1 and example glass compositions E1-E7 having a length of 2.54 cm, a width of 2.54 cm, and a thickness of 1 mm were immersed in a molten salt bath comprised of 100 wt % KNO$_3$ at 410° C. until the glass articled obtained a depth of compression DOC of 30 μm. The compressive stress CS and depth of compression DOC values listed in Table 4 were measured by FSM.

TABLE 4

| Example | C1 | E1 | E2 | E3 | E4 | E5 | E6 | E7 |
|---------|-----|-----|-----|-----|-----|-----|-----|-----|
| CS (MPa) | 961 | 849 | 910 | 904 | 942 | 990 | 975 | 882 |
| DOC (μm) | 30 | 30 | 30 | 30 | 30 | 30 | 30 | 30 |
| Time (hr.) | 3.4 | 1.0 | 0.9 | 0.2 | 0.3 | 0.4 | 0.4 | 1.7 |
| CS/E | 13.5 | 13.4 | 14.0 | 13.4 | 13.8 | 14.4 | 14.8 | 14.0 |

As shown in Table 4, glass articles formed from example glass compositions E1-E7 were able to achieve a depth of compression DOC value of 30 μm in a shorter amount of time than the glass article formed from comparative glass composition C1. A shorter ion-exchange time period means there is less time for the compressive stress CS imparted to the glass to relax. As such, glass articles formed from example glass compositions E2 and E4-E7 achieved a higher CS/E ratio that comparative glass composition C1 at a depth of compression DOC of 30 μm. As indicated by Table 4, glass articles formed from the low-modulus glass compositions described herein may be ion-exchanged in a relatively short period of time to impart a relative high compressive stress and, thereby, obtain a relatively high CS/E ratio.

It will be apparent to those skilled in the art that various modifications and variations may be made to the aspects described herein without departing from the spirit and scope of the claimed subject matter. Thus, it is intended that the specification cover the modifications and variations of the various aspects described herein provided such modification and variations come within the scope of the appended claims and their equivalents.

What is claimed is:

1. A glass composition comprising:

greater than or equal to 40 mol % and less than or equal to 57 mol % SiO$_2$;

greater than or equal to 15 mol % and less than or equal to 30 mol % Al$_2$O$_3$;

greater than or equal to 8 mol % and less than or equal to 10 mol % B$_2$O$_3$;

greater than or equal to 4 mol % and less than or equal to 5 mol % P$_2$O$_5$;

greater than or equal to 14 mol % and less than or equal to 17 mol % Na$_2$O;

greater than or equal to 4 mol % and less than 5 mol % K$_2$O; and greater than or equal to 0 mol % and less than or equal to 3 mol % Li$_2$O, wherein R$_2$O/Al$_2$O$_3$ is greater than or equal to 0.8, wherein R$_2$O is the sum of Na$_2$O, K$_2$O, and Li$_2$O; and B$_2$O$_3$+P$_2$O$_5$+K$_2$O is greater than or equal to 3 mol % and less than or equal to 25 mol %.

2. The glass composition of claim 1, wherein B$_2$O$_3$+P$_2$O$_5$+K$_2$O is greater than or equal to 8 mol % and less than or equal to 23 mol %.

3. The glass composition of claim 1, wherein the glass composition comprises greater than or equal to 9 mol % and less than or equal to 10 mol % B$_2$O$_3$.

4. The glass composition of claim 1, wherein (R$_2$O+P$_2$O$_5$)/Al$_2$O$_3$ is greater than or equal to 0.9 and less than or equal to 1.5.

5. The glass composition of claim 1, wherein the glass composition comprises less than or equal to 5 mol % RO, wherein RO is the sum of MgO, CaO, SrO, and BaO.

6. The glass composition of claim 1, wherein the glass composition comprises:

greater than or equal to 40 mol % and less than or equal to 56 mol % SiO$_2$; and less than or equal to 5 mol % RO, wherein RO is the sum of MgO, CaO, SrO, and BaO, wherein:

R$_2$O/Al$_2$O$_3$ is greater than or equal to 0.9.

7. The glass composition of claim 1, wherein the glass composition comprises:

greater than or equal to 17.3 mol % and less than or equal to 30 mol % Al$_2$O$_3$;

less than or equal to 1 mol % RO, wherein RO is the sum of MgO, CaO, SrO, and BaO, wherein:

(R$_2$O+P$_2$O$_5$)/Al$_2$O$_3$ is greater than or equal to 0.9 and less than or equal to 1.5.

8. An ion-exchanged glass article comprising:

greater than or equal to 40 mol % and less than or equal to 57 mol % SiO$_2$;

greater than or equal to 15 mol % and less than or equal to 30 mol % Al$_2$O$_3$;

greater than or equal to 8 mol % and less than or equal to 10 mol % B$_2$O$_3$;

greater than or equal to 4 mol % and less than or equal to 5 mol % P$_2$O$_5$;

greater than or equal to 14 mol % and less than or equal to 17 mol % Na$_2$O;

greater than or equal to 4 mol % and less than or equal to 75 mol % K$_2$O; and greater than or equal to 0 mol % and less than or equal to 3 mol % Li$_2$O, wherein R$_2$O/Al$_2$O$_3$ is greater than or equal to 0.8, wherein R$_2$O is the sum of Na$_2$O, K$_2$O, and Li$_2$O;

$B_2O_3+P_2O_5+K_2O$ is greater than or equal to 3 mol % and less than or equal to 25 mol %;

a Young's modulus of the glass article, before being ion-exchanged, is greater than or equal to 40 GPa and less than or equal to 70 GPa; and a thickness of the glass article is greater than or equal to 10 μm and less than 200 μm and a depth of compression of the glass article is greater than or equal to 5 μm and less than or equal to 40 μm.

9. The glass article of claim 8, wherein:

a peak compressive stress of the glass article is greater than or equal to 500 MPa and less than or equal to 1100 MPa;

the thickness of the glass article is greater than or equal to 10 μm and less than or equal to 100 μm and a depth of compression of the glass article is greater than or equal to 5 μm and less than or equal to 40 μm; and a maximum central tension of the glass article is greater than or equal to 250 MPa and less than or equal to 650 MPa.

10. The glass article of claim 8, wherein a ratio of peak compressive stress to Young's modulus of the glass article is greater than or equal to 13.

11. The glass article of claim 8, wherein when the glass article is greater than or equal to 350 MPa and less than or equal to 475 MPa at an article thickness of 35 μm.

12. A consumer electronic device, comprising:

a housing having a front surface, a back surface, and side surfaces;

electrical components provided at least partially within the housing, the electrical components including at least a controller, a memory, and a display, the display being provided at or adjacent the front surface of the housing; and the glass article of claim 11 disposed over the display.

13. A method of strengthening a glass article, the method comprising: immersing the glass article in an ion-exchange solution, the glass article comprising:

greater than or equal to 40 mol % and less than or equal to 57 mol % $SiO_2$;

greater than or equal to 15 mol % and less than or equal to 30 mol % $Al_2O_3$;

greater than or equal to 8 mol % and less than or equal to 10 mol % $B_2O_3$;

greater than or equal to 4 mol % and less than or equal to 5 mol % $P_2O_5$;

greater than or equal to 14 mol % and less than or equal to 17 mol % $Na_2O$;

greater than or equal to 4 mol % and less than or equal to 75 mol % $K_2O$; and greater than or equal to 0 mol % and less than or equal to 3 mol % $Li_2O$, wherein $R_2O/Al_2O_3$ is greater than or equal to 0.8, wherein $R_2O$ is the sum of $Na_2O$, $K_2O$, and $Li_2O$; and $B_2O_3+P_2O_5+K_2O$ is greater than or equal to 3 mol % and less than or equal to 25 mol %; and ion-exchanging the glass article in the ion-exchange solution for a time period greater than or equal to 0.1 hour and less than or equal to 2 hours at a temperature greater than or equal to 350° C. and less than or equal to 480° C. to achieve a compressive stress layer extending from a surface of the glass article to a depth of compression and comprising a peak compressive stress value in a range of 500 MPa to 1100 MPa;

wherein a thickness of the glass article is greater than or equal to 10 μm and less than 200 μm and a depth of compression of the glass article is greater than or equal to 5 μm and less than or equal to 40 μm.

14. The method of claim 13, wherein the thickness of the glass article is greater than or equal to 10 μm and less than or equal to 100 μm; and a maximum central tension of the glass article is greater than or equal to 250 MPa and less than or equal to 650 MPa.

15. The method of claim 13, wherein a Young's modulus of the glass article, before being ion-exchanged, is greater than or equal to 40 GPa and less than or equal to 70 GPa; and a ratio of peak compressive stress to Young's modulus of the glass article is greater than or equal to 13.

16. The method of claim 13, wherein when the glass article is bent to a platen spacing of 6 mm, a maximum central tension of the bent glass article is greater than or equal to 350 MPa and less than or equal to 475 MPa at an article thickness of 35 μm.

17. The glass composition of claim 1, wherein a Young's modulus of the glass composition is greater than or equal to 40 GPa and less than or equal to 70 GPa.

18. The glass composition of claim 1, wherein the glass composition is in the form of a glass article having a thickness of greater than or equal to 10 μm and less than 200 μm.

19. The glass composition of claim 18, wherein the glass article is an ion-exchanged glass article comprising a depth of compression of greater than or equal to 5 μm and less than or equal to 40 μm.

20. The glass composition of claim 18, wherein the thickness of the glass article is greater than or equal to 10 μm and less than or equal to 100 μm.

* * * * *